United States Patent
Kijima et al.

(10) Patent No.: US 11,644,068 B2
(45) Date of Patent: May 9, 2023

(54) CLUTCH AND MOTOR

(71) Applicant: DENSO CORPORATION, Kariya (JP)

(72) Inventors: Shusuke Kijima, Kariya (JP); Ryosuke Asaoka, Kariya (JP); Yuki Date, Kariya (JP); Daisuke Nishio, Kariya (JP)

(73) Assignee: DENSO CORPORATION, Kariya (JP)

( * ) Notice: Subject to any disclaimer, the term of this patent is extended or adjusted under 35 U.S.C. 154(b) by 204 days.

(21) Appl. No.: 15/734,435

(22) PCT Filed: Jul. 8, 2019

(86) PCT No.: PCT/JP2019/026989
§ 371 (c)(1),
(2) Date: Dec. 2, 2020

(87) PCT Pub. No.: WO2020/022043
PCT Pub. Date: Jan. 30, 2020

(65) Prior Publication Data
US 2021/0222742 A1   Jul. 22, 2021

(30) Foreign Application Priority Data
Jul. 24, 2018   (JP) .............................. JP2018-138519

(51) Int. Cl.
| F16D 41/067 | (2006.01) |
| F16D 41/08 | (2006.01) |
| H02K 7/108 | (2006.01) |
| H02K 7/116 | (2006.01) |

(52) U.S. Cl.
CPC ......... *F16D 41/088* (2013.01); *F16D 41/067* (2013.01); *H02K 7/108* (2013.01); *H02K 7/1166* (2013.01)

(58) Field of Classification Search
CPC .... F16D 41/088; F16D 41/067; F16D 41/105; H02K 7/108; H02K 7/1166
See application file for complete search history.

(56) References Cited

U.S. PATENT DOCUMENTS

| 7,347,115 | B2 * | 3/2008 | Otaki ..................... F16D 65/28 74/89.37 |
| 9,976,608 | B2 * | 5/2018 | Akiyoshi ................ F16D 21/08 |
| 10,087,997 | B2 * | 10/2018 | Oguri .................... F16D 41/066 |
| 10,683,901 | B2 * | 6/2020 | Sturgin ................. F16D 41/105 |
| 2017/0009822 | A1 | 1/2017 | Oguri |
| 2019/0162248 | A1 | 5/2019 | Oguri et al. |

FOREIGN PATENT DOCUMENTS

JP   2005337436 A   12/2005

OTHER PUBLICATIONS

Aug. 20, 2019 International Search Report issued in International Patent Application No. PCT/JP2019/026989.

* cited by examiner

*Primary Examiner* — Huan Le
(74) *Attorney, Agent, or Firm* — Oliff PLC

(57) ABSTRACT

A clutch includes a clutch housing, a driving rotating body, a driven rotating body, a roller arranged between the clutch housing and the driven rotating body, a support member that holds the roller between the clutch housing and the driven rotating body, and grease arranged between the clutch housing and the roller. The support member includes a guiding portion that guides grease, which has been moved from a space between the clutch housing and the roller, to the space between the clutch housing and the roller during rotation.

13 Claims, 14 Drawing Sheets

CLUTCH AND MOTOR

CROSS-REFERENCE TO RELATED APPLICATIONS

The present application is based on Japanese Patent Application No. 2018-138519 filed on Jul. 24, 2018, the entire contents of which are incorporated herein by reference.

TECHNICAL FIELD

The present disclosure relates to a clutch and a motor.

BACKGROUND ART

A conventional motor used as a drive source for a power window device or the like installed in a vehicle includes a motor unit that has a rotary shaft driven for rotation and an output unit that has a driven shaft to which the rotational driving force of the rotary shaft is transmitted to output the rotational driving force transmitted to the driven shaft. The rotary shaft and the driven shaft are connected by a clutch that is actuated to transmit the rotational driving force of the rotary shaft to the driven shaft but not to transmit rotational force from the driven shaft to the rotary shaft (refer to, for example, Patent Document 1).

Such a clutch includes a driving rotating body that is rotated integrally with the rotary shaft, a driven rotating body that is engageable with the driving rotating body in a rotation direction and rotated integrally with the driven shaft, and a cylindrical clutch housing into which the driving rotating body and the driven rotating body are inserted. A roller is arranged between the inner circumferential surface of the clutch housing and the driven rotating body to restrict the rotation of the driven rotating body (i.e., rotation of driven side) when sandwiched (wedged) between the inner circumferential surface of the clutch housing and the driven rotating body during non-rotational driving of the rotary shaft. The roller is held by a support member inserted into the clutch housing so that the central axis of the roller extends parallel to the rotation axis of the driving rotating body. When the rotary shaft is rotatably driven, the support member is rotated about the rotation axis of the driving rotating body together with the driving rotating body. Thus, when the rotary shaft is rotatably driven, the roller, while being held by the support member, is rotated about the rotation axis of the driving rotating body together with the driving rotating body and the driven rotating body along the inner circumferential surface of the clutch housing. The clutch includes grease applied between the inner circumferential surface of the clutch housing and the roller so that appropriate frictional force is produced by the inner circumferential surface of the clutch housing and the roller.

PRIOR ART DOCUMENT

Patent Document

Patent Document 1: Japanese Laid-Open Patent Publication No. 2017-17952

SUMMARY OF THE INVENTION

In a clutch such as that described above, grease will move away from the space between the inner circumferential surface of the clutch housing and the roller because of repetitive actuation of the cutch. Thus, the friction (coefficient of friction) between the inner circumferential surface of the clutch housing and the roller may not be appropriately maintained and the functionality for restricting the rotation of the driven side may not be maintained when the driving side is in a non-driving state.

It is an object of the present disclosure to provide a clutch and a motor that maintain the functionality for restricting the rotation of a driven side in a preferred manner when a driving side is in a non-driving state.

According one aspect of the present disclosure, a clutch (40) includes an annular clutch housing (41), a driving rotating body (42) that is rotatably driven, a driven rotating body (45) to which rotational driving force is transmitted from the driving rotating body, a roller (44) arranged between an inner circumferential surface (41*c*) of the clutch housing and the driven rotating body, wherein when the driving rotating body is rotatably driven, the roller is rotated about a rotation axis of the driving rotating body together with the driving rotating body, and when the driving rotating body is in a non-rotatably driven state, the roller is held between the inner circumferential surface (41*c*) of the clutch housing and the driven rotating body to restrict rotation of the driven rotating body, a support member (43) that holds the roller between the inner circumferential surface of the clutch housing and the driven rotating body, wherein the support member is rotated about the rotation axis of the driving rotating body together with the driving rotating body, and grease (GR) arranged at least between the inner circumferential surface of the clutch housing and the roller. The support member includes a guiding portion (91, 92, 95, 97, 99) that guides grease, which has been moved from a space between the inner circumferential surface of the clutch housing and the roller, to the space between the inner circumferential surface of the clutch housing and the roller during rotation.

With this structure, the support member includes the guiding portion that guides grease, which has been moved from a space between the inner circumferential surface of the clutch housing and the roller, to the space between the inner circumferential surface of the clutch housing and the roller during rotation. This maintains appropriate friction (coefficient of friction) between the inner circumferential surface of the clutch housing and the roller, thereby maintaining the functionality for restricting the rotation of the driven side in a preferred manner when the driving side is in a non-driving state.

BRIEF DESCRIPTION OF THE DRAWINGS

The objective, other objectives, features, and advantages of the present disclosure will now be described clearly in detail with reference to the accompanying drawings.

MODES FOR CARRYING OUT THE INVENTION

A motor including a clutch according to one embodiment will now be described.

Figure 1:
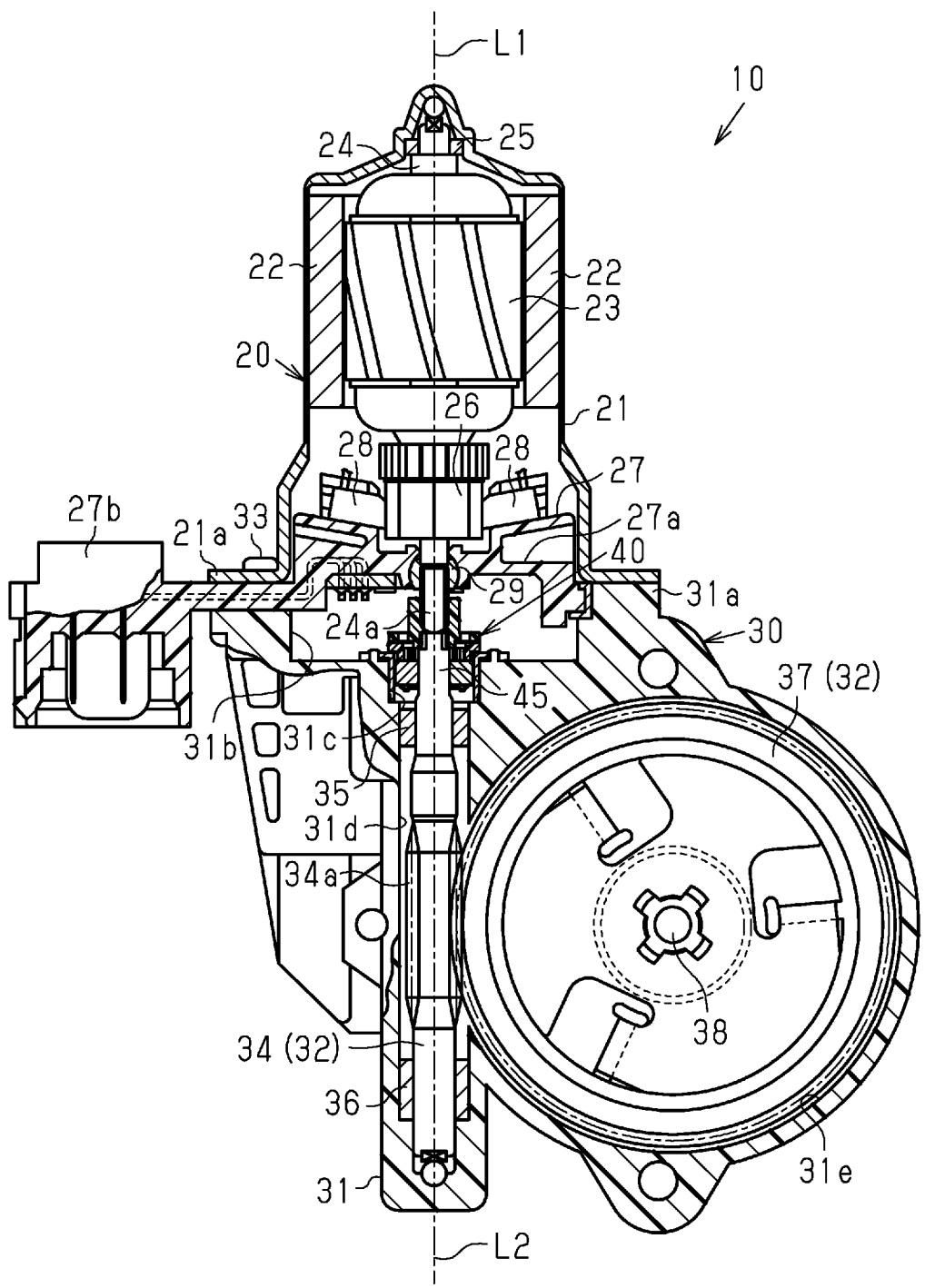
FIG. 1 is a cross-sectional view showing a motor according to one embodiment.

A motor 10 in the present embodiment shown in FIG. 1 is installed in a power window device that electrically raises and lowers a window glass of a vehicle. The motor 10 includes a motor unit 20 and an output unit 30 that are coupled to each other in an integrated manner. The motor unit 20 generates rotational force. The output unit 30 reduces the speed of the rotation output from the motor unit 20, and outputs the rotation at the reduced speed. The motor 10 also includes a clutch 40 at a drive-coupling portion between the motor unit 20 and the output unit 30.

The motor unit 20 in the present embodiment includes a direct-current motor. The motor unit 20 includes a tubular yoke housing 21 (hereafter referred to as yoke 21) having a closed end, magnets 22 fixed to the inner circumferential surface of the yoke 21, and an armature 23 arranged at the inner side of the magnets 22. The armature 23 includes a rotary shaft 24 arranged at the central portion of the yoke 21. The rotary shaft 24 has a proximal end (upper end in FIG. 1) and a distal end. The proximal end is supported by a bearing 25 arranged at the center of the closed end of the yoke 21. A cylindrical commutator 26 is fixed to a portion of the rotation shaft 24 near the distal end. The distal end of the rotary shaft 24 (lower end in FIG. 1) includes a coupling portion 24a shaped to have two parallel flat surfaces that are cut out from a cylindrical shape. The shape obtained with the two parallel flat surfaces includes two parallel straight lines in cross section. In one example, the two parallel straight lines are connected by arcuate curves in cross section.

The yoke 21 includes an open end from where a flange 21a extends outward. A brush holder 27 is fitted to the open end of the yoke 21. The brush holder 27 includes a holder body 27a that is shaped to close the open end of the yoke 21 and a connector unit 27b that projects outward from the holder body 27a in the radial direction of the yoke 21. The connector unit 27b is connected to an external connector (not shown). The holder body 27a holds power supply brushes 28 that are electrically connected to the connector unit 27b by a wire (not shown) and slide in contact with the commutator 26. The holder body 27a holds a bearing 29 at its substantially central portion. The bearing 29 rotationally supports the rotation shaft 24 at a portion between the commutator 26 and the coupling portion 24a. When external power is supplied via the connector unit 27b, the brushes 28, and the commutator 26 to the armature 23, the armature 23 (rotary shaft 24) is rotatably driven, that is, the motor unit 20 is rotatably driven.

The output unit 30 includes a plastic gear housing 31 that accommodates a speed reduction mechanism 32 or the like. The gear housing 31 includes a fixing portion 31a at a section opposed to the motor unit 20 in the axial direction (upper end in FIG. 1). The fixing portion 31a fixes the gear housing 31 to the motor unit 20. The fixing portion 31a is shaped identically to the flange 21a of the yoke 21. The fixing portion 31a includes an accommodating recess 31b that is open to the inside of the yoke 21. The holder body 27a of the brush holder 27 is partially fitted into the accommodating recess 31b. In this state, the flange 21a abutting the fixing portion 31a is fixed to the fixing portion 31a by screws 33. This fixes the yoke 21 to the gear housing 31 so that the motor unit 20 is integrated with the output unit 30. The brush holder 27 is held between the yoke 21 and the fixing portion 31a.

The gear housing 31 includes a clutch accommodating recess 31c extending from the center of the bottom of the accommodating recess 31b in the axial direction and a worm shaft accommodating portion 31d extending from the center of the bottom of the clutch accommodating recess 31c in the direction of the central axis L1 of the rotary shaft 24. The gear housing 31 also includes a wheel accommodating portion 31e beside the worm shaft accommodating portion 31d (rightward in FIG. 1). The wheel accommodating portion 31e is connected to the worm shaft accommodating portion 31d at a substantially central part of the worm shaft accommodating portion 31d in the axial direction (longitudinal direction).

The worm shaft accommodating portion 31d accommodates a worm shaft 34 that serves as a substantially cylindrical driven shaft. The worm shaft 34, which is made of a metal material, includes an externally threaded worm 34a at its central portion in the axial direction. The worm shaft 34 includes ends in the axial direction that are supported by two bearings 35, 36 arranged at the ends of the worm shaft accommodating portion 31d in the axial direction. The worm shaft 34, which is arranged inside the worm shaft accommodating portion 31d, is supported by the bearings 35, 36 so that the worm shaft 34 is coaxial with the rotary shaft 24. That is, the central axis L1 of the rotary shaft 24 and the central axis L2 of the worm shaft 34 are lie on the same straight line.

The wheel accommodating portion 31e rotationally accommodates a disk-shaped worm wheel 37 meshed with the worm 34a of the worm shaft 34. The worm wheel 37 and the worm shaft 34 form the speed reduction mechanism 32. That is, the speed reduction mechanism 32 of the present embodiment includes a worm speed reduction mechanism (i.e., worm gear). The worm wheel 37 includes an output shaft 38 at its central portion in the radial direction. The output shaft 38 extends in the axial direction of the worm wheel 37 (direction perpendicular to plane of FIG. 1) and rotates integrally with the worm wheel 37. The output shaft 38 is connected to a window glass of a vehicle by a window regulator (not shown).

The clutch accommodating recess 31c accommodates the clutch 40 that connects the rotary shaft 24 of the motor unit 20 to the worm shaft 34 of the output unit 30.

Figure 2:
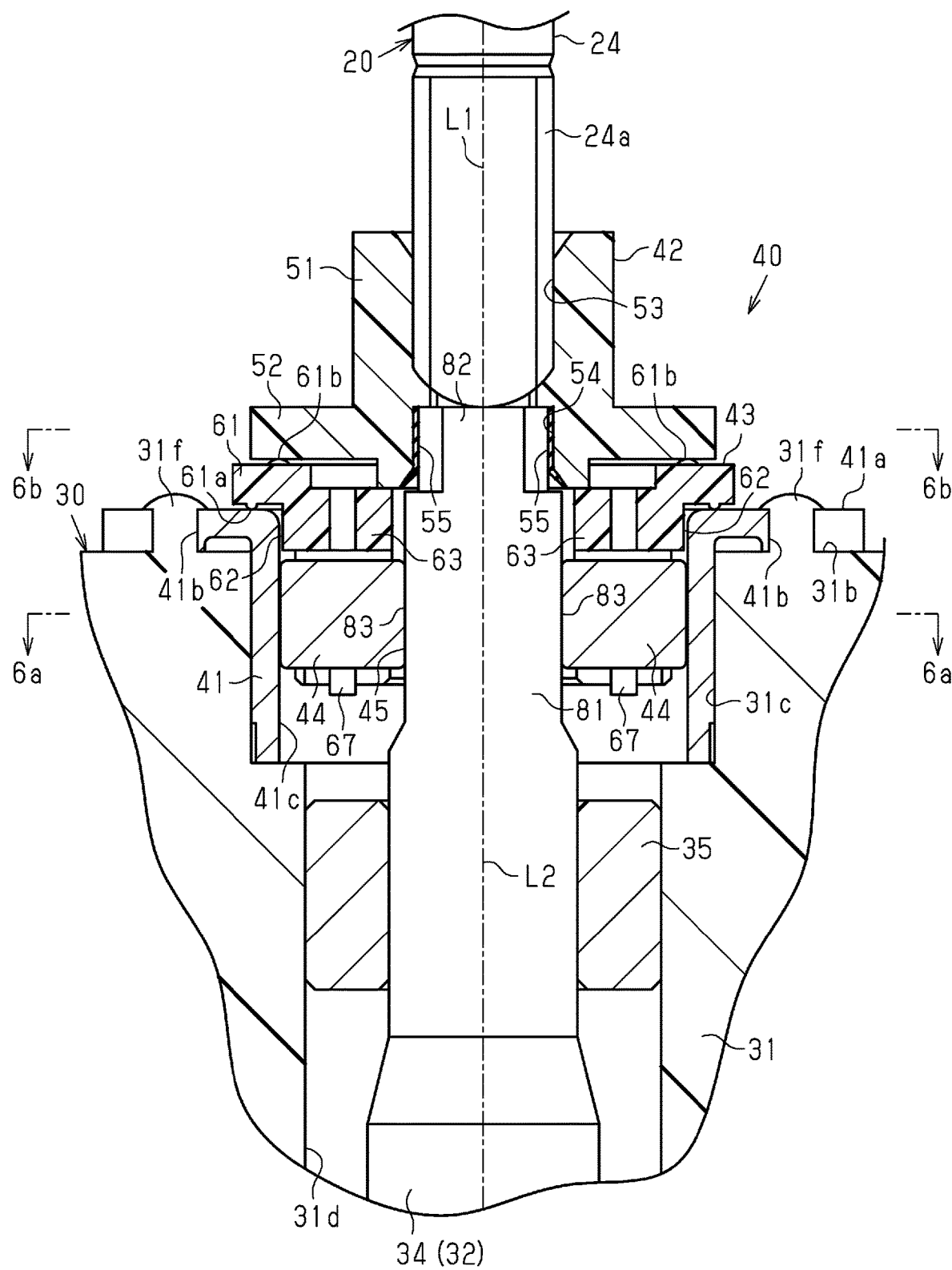
FIG. 2 is a partially enlarged cross-sectional view showing the motor of the embodiment.
Figure 3:
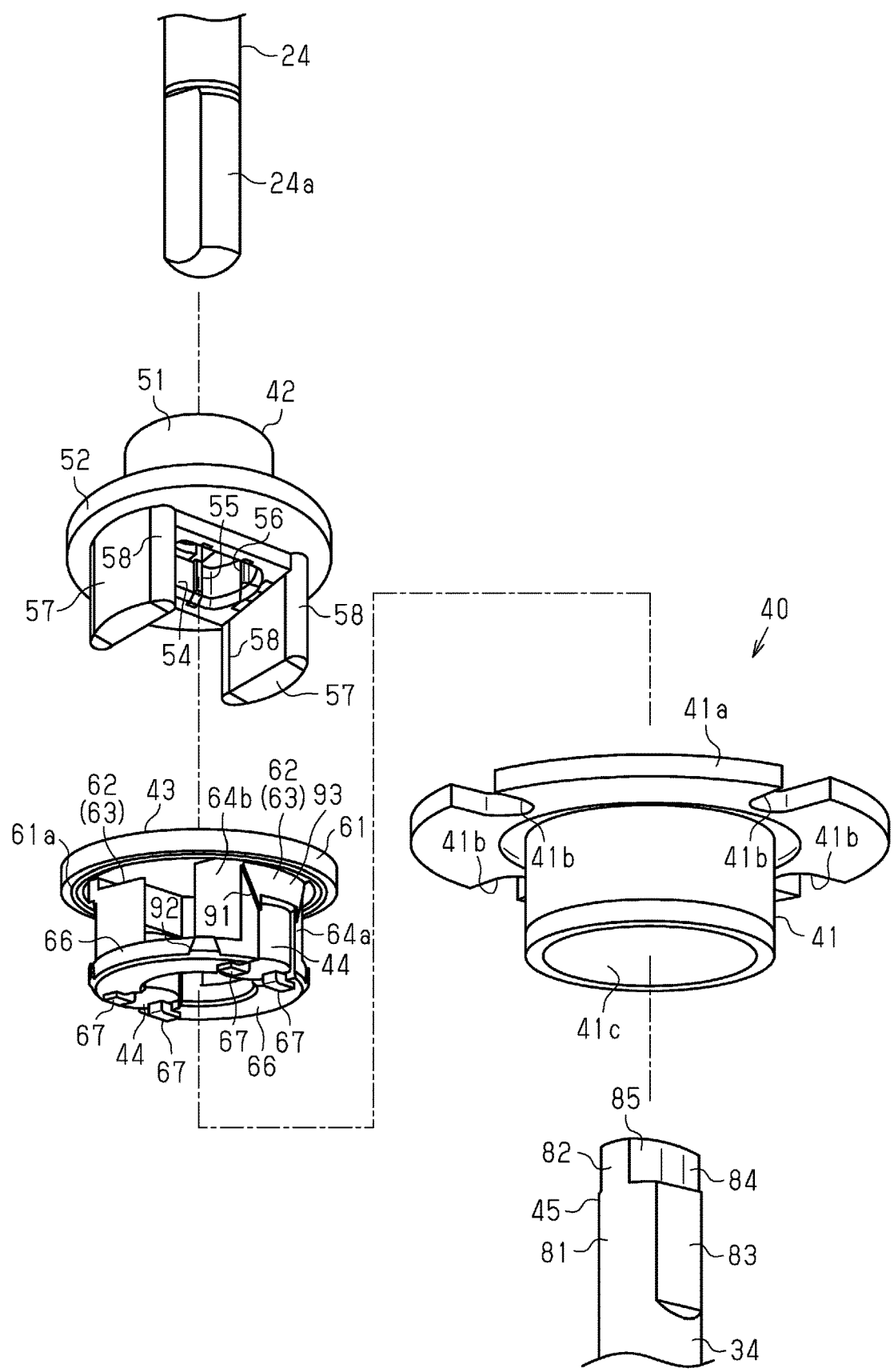
FIG. 3 is an exploded perspective view showing a clutch of the embodiment.

As shown in FIGS. 2 and 3, the clutch 40 includes an annular clutch housing 41, a driving rotating body 42, a support member 43, rollers 44, and a driven rotating body 45.

The clutch housing 41 is cylindrical and includes a collar-like fixing flange 41a that extends outward in the radial direction from the proximal end of the clutch housing 41 in the axial direction. The outer diameter of the cylindrical section of the clutch housing 41 is substantially equal to the inner diameter of the clutch accommodating recess 31c. The outer diameter of the fixing flange 41a is greater than the inner diameter of the clutch accommodating recess 31c. The fixing flange 41a includes four fixing recesses 41b arranged at equal angular intervals in the circumferential direction. Each fixing recess 41b extends through the fixing flange 41a in the axial direction and is open toward the outer side in the radial direction.

As shown in FIG. 2, the clutch housing 41 is fitted into the clutch accommodating recess 31c from the distal end until the fixing flange 41a abuts the bottom surface of the accommodating recess 31b. The clutch housing 41 is fixed to the gear housing 31 at the fixing flange 41a. Specifically, four fixing projections 31f arranged at equal angular intervals in the circumferential direction project from the bottom surface of the accommodating recess 31b around the opening of the clutch accommodating recess 31c. The four fixing projections 31f are inserted through the four fixing recesses 41b of the fixing flange 41a in the axial direction, and the distal end of each fixing projections 31f is processed through heat swaging. This fixes the clutch housing 41 to the gear housing 31 so as to be immovable in the axial direction and non-rotatable in the circumferential direction. The clutch housing 41 fixed to the gear housing 31 is arranged coaxially with the rotary shaft 24 and the worm shaft 34.

The driving rotating body 42 includes a substantially cylindrical shaft coupling portion 51. The outer circumferential surface of the shaft coupling portion 51 is formed integrally with a disk-shaped collar 52 that extends outward in the radial direction.

The shaft coupling portion 51 includes a drive shaft insertion hole 53 that extends in the axial direction along the axis at the axial end that is close to the motor unit 20 (upper end in FIG. 2). The drive shaft insertion hole 53 is shaped to have two parallel flat surfaces in conformance with the shape of the coupling portion 24a of the rotary shaft 24. When the coupling portion 24a is press-fitted into the drive shaft insertion hole 53, the driving rotating body 42 and the rotary shaft 24 are connected to be rotatable integrally. The rotary shaft 24 and the driving rotating body 42, which is connected to the rotary shaft 24, are coaxial (i.e., central axes lie on same straight line).

Further, the shaft coupling portion 51 includes a driven shaft insertion hole 54 that extends in the axial direction along the axis at the axial end that is close to the output unit 30 (lower end in FIG. 2). The central axis of the driven shaft insertion hole 54 coincides with the central axis of the drive shaft insertion hole 53. In the present embodiment, the drive shaft insertion hole 53 is connected to the driven shaft insertion hole 54.

Figure 6A:
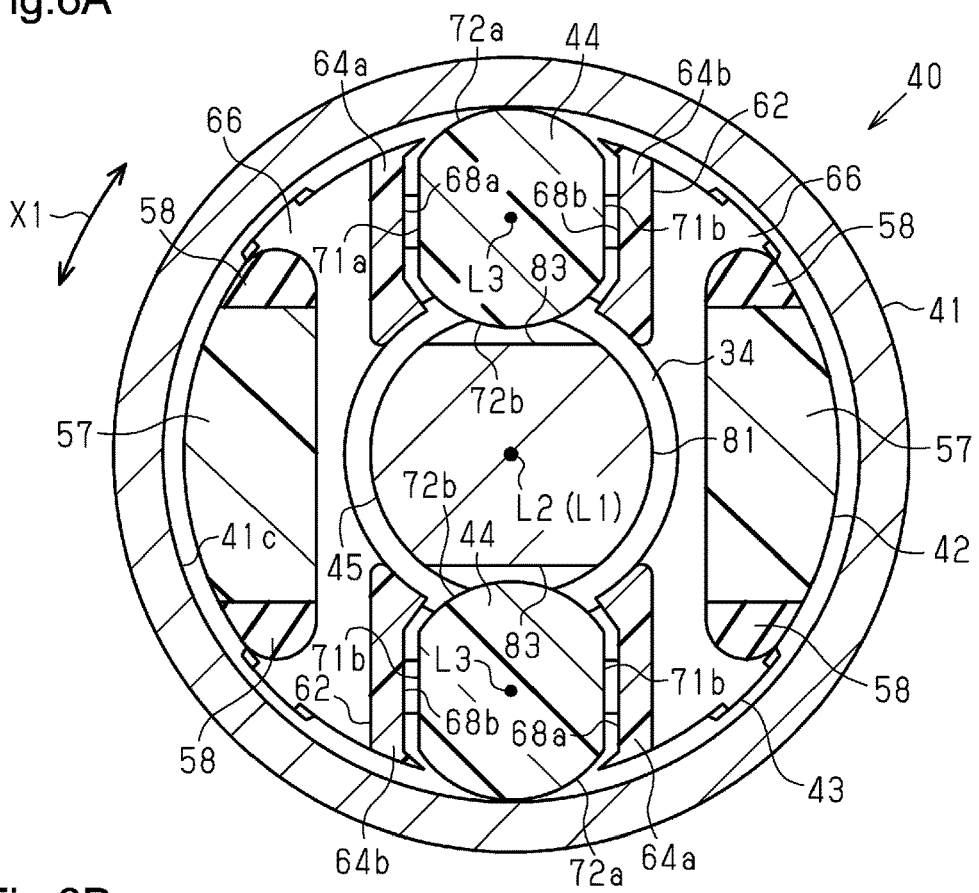
FIG. 6A is a cross-sectional view (taken along line 6a-6a in FIG. 2) showing the clutch of the embodiment.
Figure 6B:
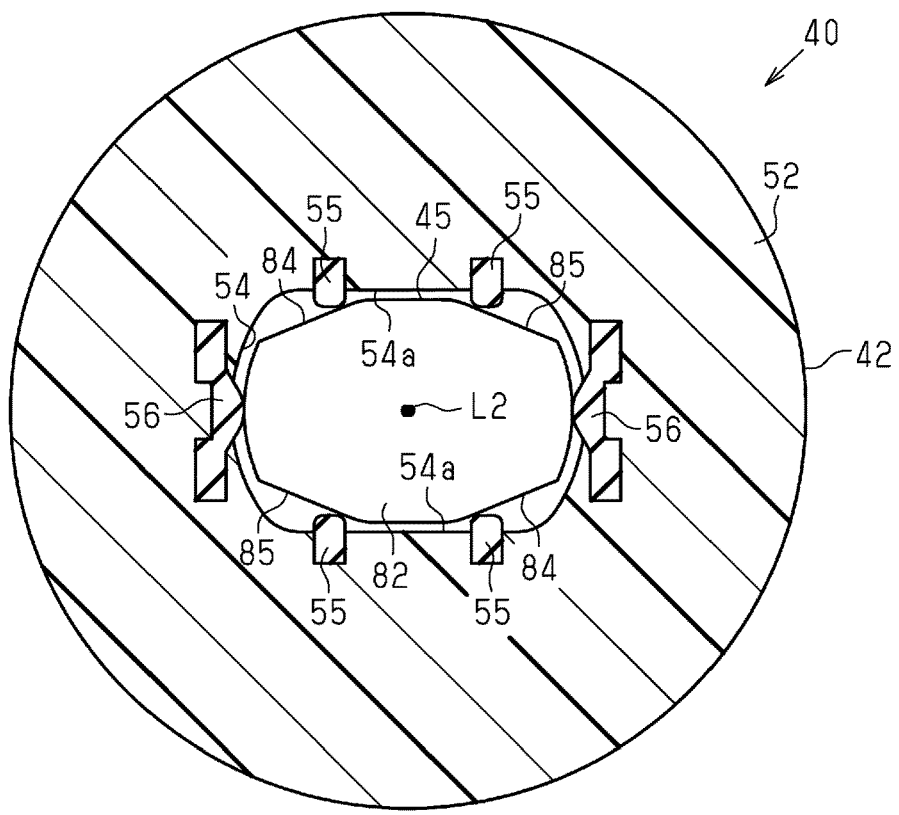
FIG. 6B is a cross-sectional view (taken along line 6b-6b in FIG. 2) showing the clutch of the embodiment.

As shown in FIG. 6B, the inner circumferential surface of the driven shaft insertion hole 54 includes two driving transmission surfaces 54a that are flat surfaces parallel to each other and parallel to the axial direction. The driven shaft insertion hole 54, when viewed in the axial direction, has the shape of an athletics track field (with two parallel flat surfaces) in which a direction parallel to the driving transmission surfaces 54a corresponds to the longitudinal direction and a direction orthogonal to the driving transmission surfaces 54a corresponds to the transverse direction. Two first elastic members 55 made of an elastic material such as rubber are arranged on each driving transmission surface 54a. A second elastic member 56 made of an elastic material such as rubber is arranged on each longitudinal end of the driven shaft insertion hole 54, as viewed in the axial direction. The first and second elastic members 55, 56 slightly project inward from the inner circumferential surface of the driven shaft insertion hole 54.

As shown in FIGS. 3 and 6a, the driving rotating body 42 includes two roller releasing portions 57 extending from the collar 52 toward the output unit 30 in the axial direction (downward in FIG. 3). The roller releasing portions 57 are arranged at the longitudinal ends of the driven shaft insertion hole 54 as viewed in the axial direction. The two roller releasing portions 57 are spaced apart by 180° in the rotation direction and arranged at positions opposed in the radial direction. The ends of each roller releasing portion 57 in the circumferential direction include an elastic portion 58 made of an elastic material such as rubber. The roller releasing portions 57 are arranged at the inner side of the clutch housing 41.

As shown in FIGS. 2 and 3, the support member 43 holds the rollers 44 between an inner circumferential surface 41c of the clutch housing 41 and the driven rotating body 45, which are opposed in the radial direction. The support member 43 of the present embodiment is plastic.

The support member 43 has a proximal end that includes an annular ring 61 extending around the central axis L2 of the worm shaft 34. The outer diameter of the ring 61 is greater than the inner diameter of the clutch housing 41. The ring 61 is arranged closer to the motor unit 20 than the fixing flange 41a of the clutch housing 41 (upward in FIG. 2) and opposed to the fixing flange 41a in the axial direction. The lower surface of the ring 61 (end surface opposed to fixing flange 41a in axial direction) includes a lower rib 61a that projects in an annular manner in the circumferential direction of the ring 61 and abuts the fixing flange 41a in the axial direction. The upper surface of the ring 61 (end surface opposed to driving rotating body 42) includes an upper rib 61b that projects in the axial direction and abuts the collar 52 of the driving rotating body 42 in the axial direction.

The inner side of the ring 61 includes roller holding portions 62, which respectively hold the cylindrical rollers 44, extend in the axial direction, and are spaced apart in the circumferential direction (two positions arranged at 180° intervals in present embodiment).

Figure 4A:
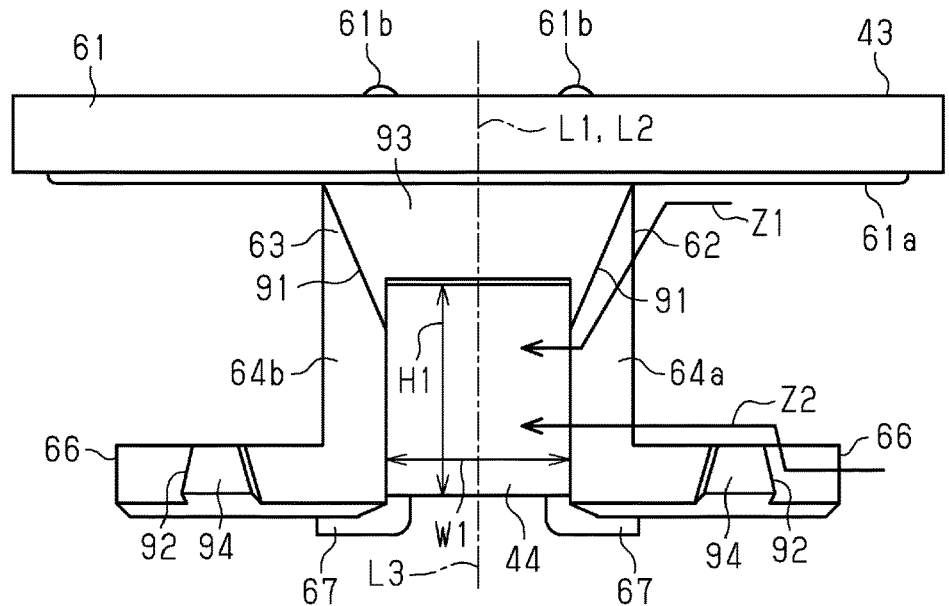
FIG. 4A is a side view showing a support member that holds a roller in the clutch of the embodiment.
Figure 4B:
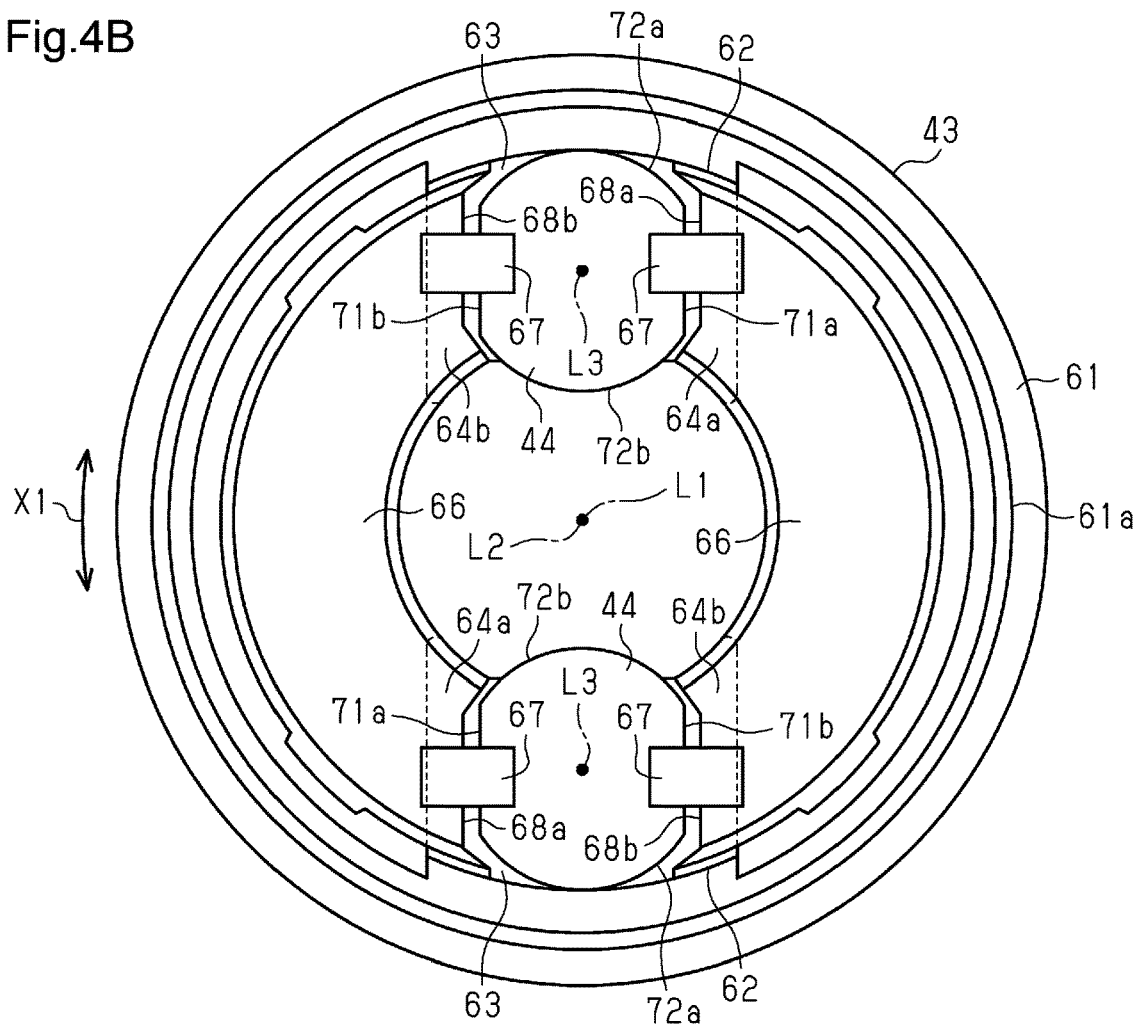
FIG. 4B is a bottom view showing the support member in the embodiment.

As shown in FIGS. 4A and 4B, each roller 44, which is made of plastic, is arranged so that its central axis L3 is parallel to the central axis L1 of the rotary shaft 24 and the central axis L2 of the worm shaft 34. The rollers 44 of the present embodiment are each shaped to have two parallel flat surfaces as viewed in the axial direction. Thus, each roller 44 is shaped to have a longitudinal direction and a transverse direction as viewed in the axial direction. In FIG. 4B, the radial direction of the clutch 40 corresponds to the longitudinal direction of each roller 44 and the circumferential direction of the clutch 40 corresponds to the transverse direction of the roller 44. The roller 44 includes flat first and second opposed surfaces 71a, 71b at two sides in the rotation direction X1 of the driving rotating body 42 (equivalent to circumferential direction of clutch 40, hereafter referred to as rotation direction X1). The roller 44 further includes first and second arcuate surfaces 72a, 72b at two sides in the radial direction of the clutch 40. The outer circumferential surface of the roller 44 of the present embodiment includes the first and second opposed surfaces 71a, 71b and the first and second arcuate surfaces 72a, 72b.

Figure 5:
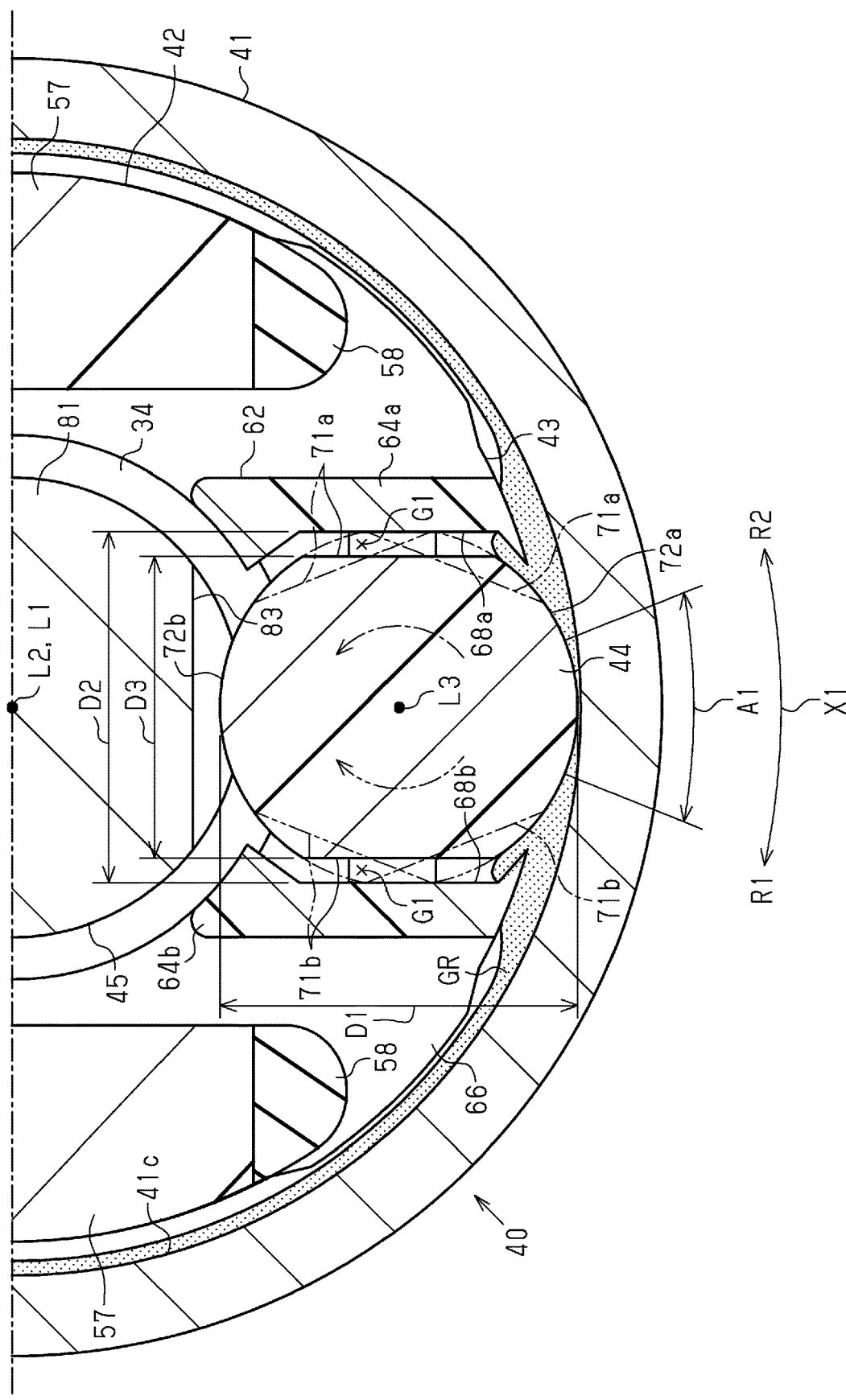
FIG. 5 is a partially enlarged cross-sectional view (taken along line 6*a*-6*a* in FIG. 2) showing the clutch of the embodiment.

As shown in FIG. 5, the first and second opposed surfaces 71a, 71b of each roller 44 are parallel to the central axis L3 and parallel to each other. The first and second arcuate surfaces 72a, 72b of the roller 44 as viewed in the axial direction are arcuate and extend around the central axis L3, which serves as the center of curvature. The curvatures of the first and second arcuate surfaces 72a, 72b are the same in the present embodiment. The first and second arcuate surfaces 72a, 72b are parallel to the central axis L3 and not inclined relative to the central axis L3. In the roller 44, the first arcuate surface 72a, which is located outward in the radial direction, is configured to oppose and contact the cylindrical inner circumferential surface 41c of the clutch housing 41. The second arcuate surface 72b, which is located inward in the radial direction, is configured to oppose and contact the driven rotating body 45. The two axial end surfaces of the roller 44 are flat surfaces that form right angles with the first and second opposed surfaces 71a, 71b (refer to FIG. 4A).

As shown in FIGS. 3, 4A, 4B, and 7, each roller holding portion 62 includes an axial support portion 63 that extends radially inward from the ring 61 and also extends in the axial direction. The axial support portion 63 covers and supports one axial end of the roller 44. The roller holding portion 62 includes two roller supports 64a, 64b that extend from the two ends of the axial support portion 63 in the circumferential direction, that is, the two sides of the axial support portion 63 around the rotation axis of the driving rotating body 42 toward the opposite side of the ring 61 (downward in FIG. 4A) in the axial direction (central axes L1, L2). The roller supports 64a, 64b of the roller holding portion 62 are located at the two sides of the roller 44 in the rotation direction X1 and hold (support) the roller 44 at the two sides of the rotation direction X1 so that the central axis L3 is parallel to the central axis L1. The roller supports 64a, 64b of the roller holding portion 62 include, when the clutch 40 is viewed from the motor unit 20 in the axial direction (as shown in FIG. 6A), a first roller support 64a that is arranged counterclockwise relative to the roller 44 and a second roller support 64b that is arranged clockwise relative to the roller 44.

The support member 43 includes coupling portions 66, each coupling the distal end of the first roller support 64a of one roller holding portion 62 to the distal end of the second roller support 64b of the other the roller holding portion 62 around the rotation axis of the driving rotating body 42. Each coupling portion 66 is arcuate and extend around the central axes L1, L2 as viewed in the axial direction. The distal ends of the roller supports 64a, 64b each include holding claws 67 that project between the first and second roller supports 64a, 64b. The holding claws 67 abut one axial end surface of the roller 44 to prevent separation of the roller 44 from the roller holding portion 62.

As shown in FIGS. 4B and 5, in the roller holding portion 62, the roller supports 64a, 64b that are paired with each other include first and second abutment surfaces 68a, 68b that are opposed to each other in the rotation direction X1. The first abutment surface 68a of the first roller support 64a is a flat surface that is parallel to the central axes L1, L2, and opposed to the first opposed surface 71a of the roller 44 arranged between the roller supports 64a, 64b. The second abutment surface 68b of the second roller support 64b is a flat surface that is parallel to central axes L1, L2 in the same manner as the first abutment surface 68a and opposed to the second opposed surface 71b of the roller 44 arranged between the roller supports 64a, 64b. The first and second opposed surfaces 71a, 71b opposed in the rotation direction X1 are parallel to each other. The lengths of the first and second abutment surfaces 68a, 68b in the axial direction are greater than the length of the roller 44 in the axial direction (lengths of first and second opposed surfaces 71a, 71b in axial direction). The widths of the first and second abutment surfaces 68a, 68b in the radial direction of the clutch 40 are greater than or equal to the widths of the first and second opposed surfaces 71a, 71b in the radial direction of the clutch 40.

The maximum outer diameter D1 of the roller 44 (that is, width of roller 44 in longitudinal direction as viewed in axial direction) is greater than distance D2 between the first abutment surface 68a and the second abutment surface 68b of the roller holding portion 62. Distance D2 of the roller holding portion 62 is greater than width D3 of the roller 44 in the rotation direction X1. In other words, distance D2 in the present embodiment is greater than the length between the first opposed surface 71a and the second opposed surface 71b or the width of the roller 44 in the transverse direction as viewed in the axial direction. Thus, a tolerance gap G1 that determines the rotation range of the roller 44 around the central axis L3 is provided between the roller supports 64a, 64b and the roller 44 arranged between the roller supports 64a, 64b. The roller supports 64a, 64b restrict rotation of the roller 44 about the central axis L3.

In FIG. 5 as viewed from motor unit 20 in the axial direction, when the roller 44 rotates counterclockwise about the central axis L3 between the roller supports 64a, 64b, the end of the first opposed surface 71a of the roller 44 close to the first arcuate surface 72a abuts the first abutment surface 68a as shown by the long-dash short-dash line. Further, the end of the second opposed surface 71b of the roller 44 close to the second arcuate surface 72b abuts the second abutment surface 68b. In contrast, as viewed from motor unit 20 in the axial direction, when the roller 44 rotates clockwise about the central axis L3 between the roller supports 64a, 64b, the end of the first opposed surface 71a of the roller 44 close to the second arcuate surface 72b abuts the first abutment surface 68a as shown by the long-dash double-short-dash line. Further, the end of the second opposed surface 71b of the roller 44 close to the first arcuate surface 72a abuts the second abutment surface 68b. In this manner, the roller supports 64a, 64b restrict the rotation of the roller 44 about the central axis L3, thereby determining a sliding range A1 in which the outer circumferential surface of the roller 44 is slidable on the inner circumferential surface 41c of the clutch housing 41.

As shown in FIGS. 2 and 6A, the two rollers 44 held by the support member 43 of the above structure are arranged at equal angular intervals (at intervals of 180° in present embodiment) in the rotation direction X1. The roller supports 64a, 64b holding the rollers 44 are inserted into the clutch housing 41 so that the rollers 44 are opposed to the clutch housing 41 in the radial direction inside the clutch housing 41. The first arcuate surface 72a of the roller 44 has a portion that corresponds to the sliding range A1 (refer to FIG. 5) that can contact the inner circumferential surface 41c of the clutch housing 41 between the roller supports 64a, 64b. The support member 43 is rotatable relative to the clutch housing 41 in rotation direction X1.

The roller releasing portions 57 of the driving rotating body 42 are inserted into the clutch housing 41 through the inner side of the ring 61 of the support member 43. The roller releasing portions 57 are each arranged between the two roller holding portions 62 so that the roller releasing portions 57 are adjacent to the roller holding portions 62 in the circumferential direction. Thus, the ends (elastic portions 58) of each roller releasing portion 57 in the rotation direction X1 are opposed to the first roller support 64a of one roller holding portion 62 and the second roller support 64b of the other roller holding portion 62 in the rotation direction X1. The support member 43 and the driving rotating body 42 are rotatable relative to each other in the rotation direction X1. Thus, when the driving rotating body 42 is rotated, the roller releasing portion 57 abuts the one of the roller supports 64a, 64b located at the front side in the rotation direction.

As shown in FIGS. 2 and 3, the driven rotating body 45, which is made of metal, is formed integrally with the proximal end (upper end in FIG. 2) of the worm shaft 34. The driven rotating body 45 includes a control portion 81 and a driven coupling portion 82 arranged in the axial direction. The driven coupling portion 82 is arranged at the proximal end of the control portion 81 (upper side in FIG. 2).

The control portion 81 is formed integrally with the worm shaft 34 and has the shape of a cylinder extending in the axial direction of the worm shaft 34. The central axis of the control portion 81 corresponds to the central axis L2 of the worm shaft 34 so that the control portion 81 is coaxial with the worm shaft 34. As shown in FIG. 6A, the control portion 81 is symmetrical with respect to the central axis L2 of the worm shaft 34 as viewed in the direction of the central axis L2.

The outer circumferential surface of the control portion 81 includes two control surfaces 83. The two control surfaces 83 are arranged at equal angular intervals (at intervals of 180° in present embodiment) on the outer circumferential surface of the control portion 81 in the circumferential direction. The control surfaces 83 are flat surfaces that are parallel to the axial direction and orthogonal to the radial direction of the driven rotating body 45. The control surfaces 83 are parallel to each other and the length of each control surface 83 in the axial direction is greater than the length of the roller 44 in the axial direction.

As shown in FIGS. 2 and 6B, the driven coupling portion 82 is rod-shaped and extends in the axial direction of the worm shaft 34. The central axis of the driven coupling portion 82 corresponds to the central axis L2 of the worm shaft 34, and the driven coupling portion 82 is coaxial with the worm shaft 34. The driven coupling portion 82 is slightly thinner than the driven shaft insertion hole 54. The driven coupling portion 82 has a substantially elliptic cross section that is orthogonal to the axial direction. The cross section is constant in the axial direction. As viewed in the axial direction, the longitudinal direction of the driven coupling portion 82 is parallel to the control surfaces 83, and the transverse direction of the driven coupling portion 82 is orthogonal to the control surfaces 83 (refer to FIG. 6A). As shown in FIG. 6B, the driven coupling portion 82 is symmetrical with respect to the central axis L2 of the worm shaft 34 as viewed in the direction of the central axis L2.

The outer circumferential surface of the driven coupling portion 82 includes two first driven transmission surfaces 84 and two second driven transmission surfaces 85. The first driven transmission surfaces 84 are arranged at intervals of 180° so that one first driven transmission surface 84 is at the opposite side of the other first driven transmission surface 84. The first driven transmission surfaces 84 are flat surfaces that are parallel to each other in the axial direction. The distance between the first driven transmission surfaces 84 is equal to the distance between the driving transmission surfaces 54a of the driven shaft insertion hole 54 in the driving rotating body 42.

The second driven transmission surfaces 85 are each arranged between the first driven transmission surfaces 84. The second driven transmission surfaces 85 are arranged at intervals of 180° so that one second driven transmission surface 85 is at the opposite side of the other second driven transmission surface 85. The second driven transmission surfaces 85 are flat surfaces that are parallel to each other in the axial direction. The distance between the second driven transmission surfaces 85 is equal to the distance between the driving transmission surfaces 54a of the driven shaft insertion hole 54 in the driving rotating body 42. The first driven transmission surfaces 84 and the second driven transmission surfaces 85 extend from one end to the other end of the driven coupling portion 82 in the axial direction.

As shown in FIG. 2, the above driven rotating body 45 is inserted into the clutch housing 41 and the support member 43 at the side opposite to the driving rotating body 42. The driven rotating body 45 is arranged coaxially with the clutch housing 41, the driving rotating body 42, and the support member 43.

As shown in FIG. 6B, the driven coupling portion 82 is loosely fitted into the driven shaft insertion hole 54 and rotatable integrally with the driving rotating body 42. The first and second elastic members 55, 56 are located between the inner circumferential surface of the driven shaft insertion hole 54 and the outer circumferential surface of the driven coupling portion 82, which is loosely fitted into the driven shaft insertion hole 54. Specifically, the two second elastic members 56 are in contact with the longitudinal ends of the driven coupling portion 82 as viewed in the axial direction. Further, the four first elastic members 55 are located between the two first driven transmission surfaces 84 and the two second driven transmission surfaces 85 and the driving transmission surfaces 54a.

When the driving rotating body 42 is rotated about the central axis relative to the driven rotating body 45, the driving transmission surfaces 54a abut the first driven transmission surfaces 84 or the second driven transmission surfaces 85 in the rotation direction while elastically deforming the first elastic members 55. Thus, the driving rotating body 42 engages the driven rotating body 45 in the rotation direction to transmit the rotational driving force of the driving rotating body 42 to the driven rotating body 45.

Further, as shown in FIG. 6A, the control portion 81 of the driven rotating body 45 is inserted into the support member 43 so that rollers 44 are located between the control surfaces 83 and the inner circumferential surface 41c of the clutch housing 41. The control portion 81 is opposed to the clutch housing 41 and the rollers 44 in the radial direction. That is, the support member 43 holds the rollers 44 between the inner circumferential surface 41c of the clutch housing 41 and the control surfaces 83 of the driven rotating body 45.

The distance between the control surface 83 and the inner circumferential surface 41c of the clutch housing 41 (distance in direction orthogonal to control surface 83) varies in the rotation direction of the driven rotating body 45. In the present embodiment, the distance between the control surface 83 and the inner circumferential surface 41c of the clutch housing 41 is longest at the center of the control surface 83 in the circumferential direction and is gradually reduced from the center of the control surface 83 in the circumferential direction toward the ends of the control surface 83 in the circumferential direction. Further, the distance between the center of the control surface 83 in the direction and the inner circumferential surface 41c of the clutch housing 41 is greater than the maximum outer diameter D1 of the roller 44 (refer to FIG. 5). The distance between the end of the control surface 83 in the circumferential direction and the inner circumferential surface 41c of the clutch housing 41 is less than the maximum outer diameter D1 of the roller 44.

As shown in FIG. 5, in the clutch 40 of the present embodiment, grease GR is applied to the inner circumferential surface 41c of the clutch housing 41. Grease GR is applied to fill the space between the inner circumferential surface 41c of the clutch housing 41 and the first arcuate surface 72a of each roller 44. The grease GR increases sliding friction between the inner circumferential surface 41c of the clutch housing 41 and the roller 44 when the rotary shaft 24 is in a non-rotatably driven state (i.e., when driving rotating body 42 is not rotatably driven). FIG. 5 schematically shows where the grease GR is applied but the other drawings do not show the grease GR.

The support member 43 of the present embodiment includes a first end drawing slope (one end drawing slope) 91 and a second end drawing slope (other end drawing slope) 92 that serve as a guiding portion and an drawing slope to guide grease GR from the gap between the inner circumferential surface 41c of the clutch housing 41 and the roller 44 to the gap between the inner circumferential surface 41c of the clutch housing 41 and the roller 44 during rotation.

Figure 7:
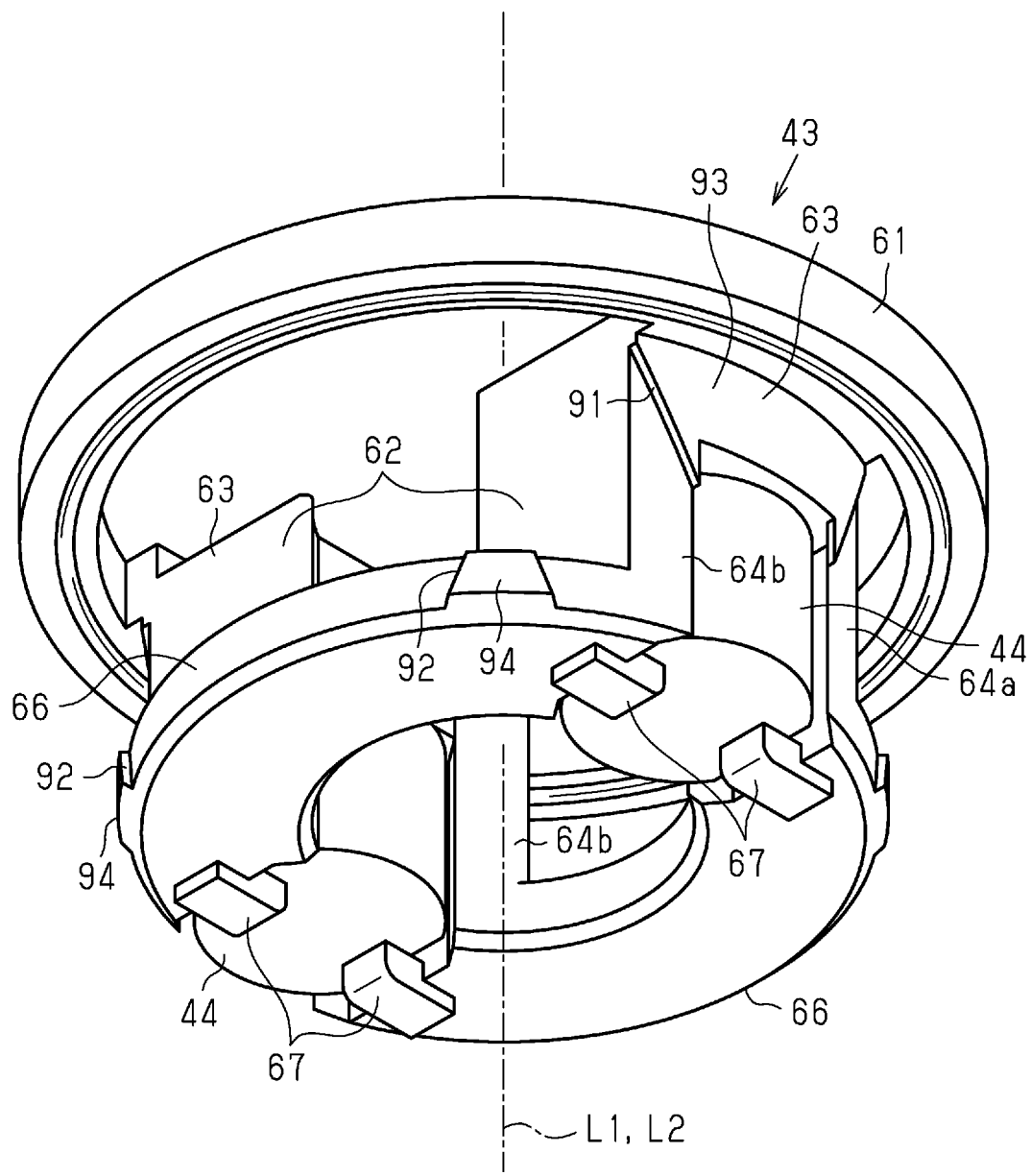
FIG. 7 is a perspective view showing the support member that holds the roller in the clutch of the embodiment.

As shown in FIGS. 4A and 7, the first end drawing slope 91 is a circumferential end surface (i.e., step) of a first end bulging portion 93 that extends outward in the radial direction from the roller holding portion 62 and includes the axial support portion 63. The first end drawing slope 91 is a surface that intersects with the circumferential direction. The first end drawing slope 91 extends from the outer side of the axial range H1 and the outer side of the circumferential range W1 of the roller 44 as viewed from the outer side in the radial direction (refer to FIG. 4A). The first end drawing slope 91 is inclined to extend from one axial end (upper end in FIG. 4A) and two circumferential ends of the outer circumferential surface of the axial support portion 63 toward the roller 44 in the axial direction and the circumferential direction. The first end drawing slope 91 of the present embodiment extends toward the inner side (lower side in FIG. 4) of one end of the axial range H1 of the roller 44.

The second end drawing slope 92 is a circumferential end surface (i.e., step) of a second end bulging portion 94 that extends outward in the radial direction from the coupling portion 66. The second end bulging portions 94 of the present embodiment are arranged near the roller supports 64a, 64b of the coupling portion 66. Each second end bulging portion 94 is shaped so that the circumferential width is reduced from the other axial end to one axial end (that is, substantially trapezoidal shape as viewed from outer side in radial direction). The second end drawing slope 92 is a surface that intersects with the circumferential direction. The second end drawing slope 92 extends from the outer side of the axial range H1 and the outer side of the circumferential range W1 of the roller 44 as viewed from the outer side in the radial direction (refer to FIG. 4A). The second end drawing slope 92 is inclined to extend from the other axial end of the coupling portion 66 (lower end in FIG. 4A) toward the roller 44 in the axial direction (upward in FIG. 4) and the circumferential direction. The second end drawing slope 92 of the present embodiment extends toward the inner side (upper side in FIG. 4) of the other end of the axial range H1 of the roller 44. The first end bulging portion 93 and the second end bulging portion 94 of the present embodiment have the same amount of bulging (that is, outer diameter). The first end drawing slope 91 and the second end drawing slope 92 are arranged to be linearly symmetrical with respect to the central axis L3 of the roller 44 as viewed from the outer side in the radial direction (refer to FIG. 4A).

The operation of the motor 10 and the clutch 40 will now be described.

Figure 8A:
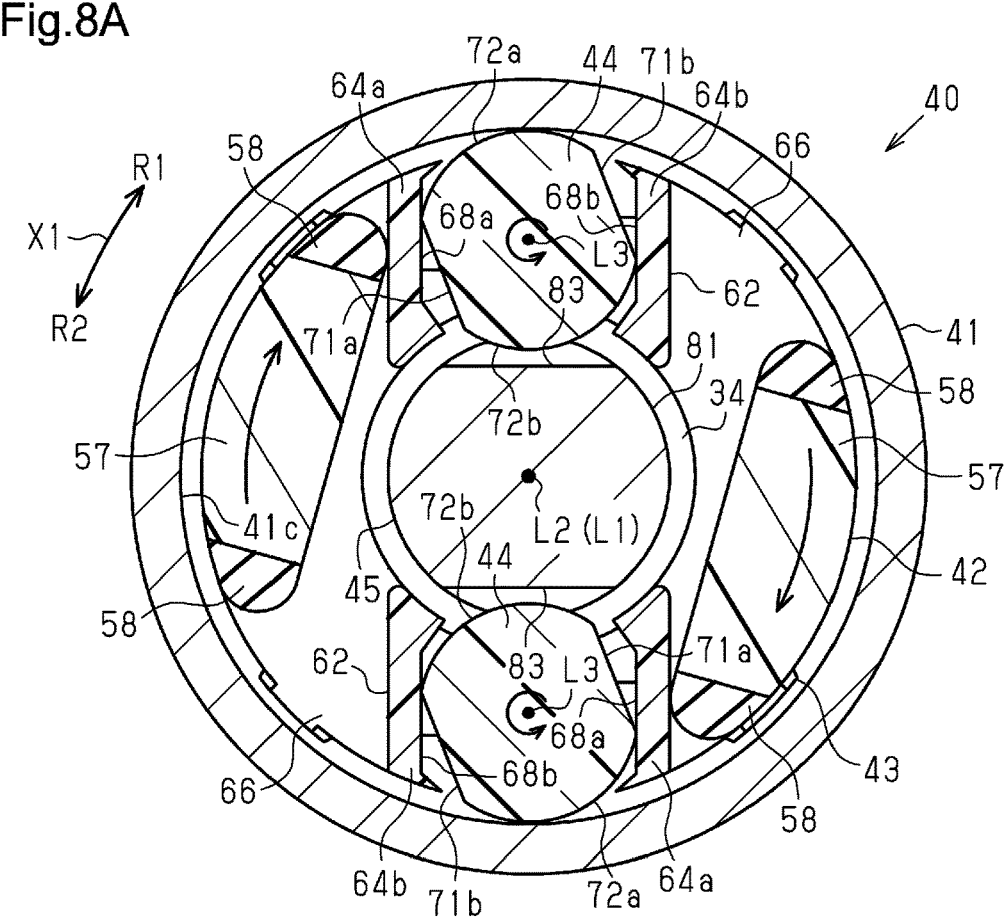
FIGS. 8A and 8B are cross-sectional views showing the operation of the clutch according to the embodiment.
Figure 8B:
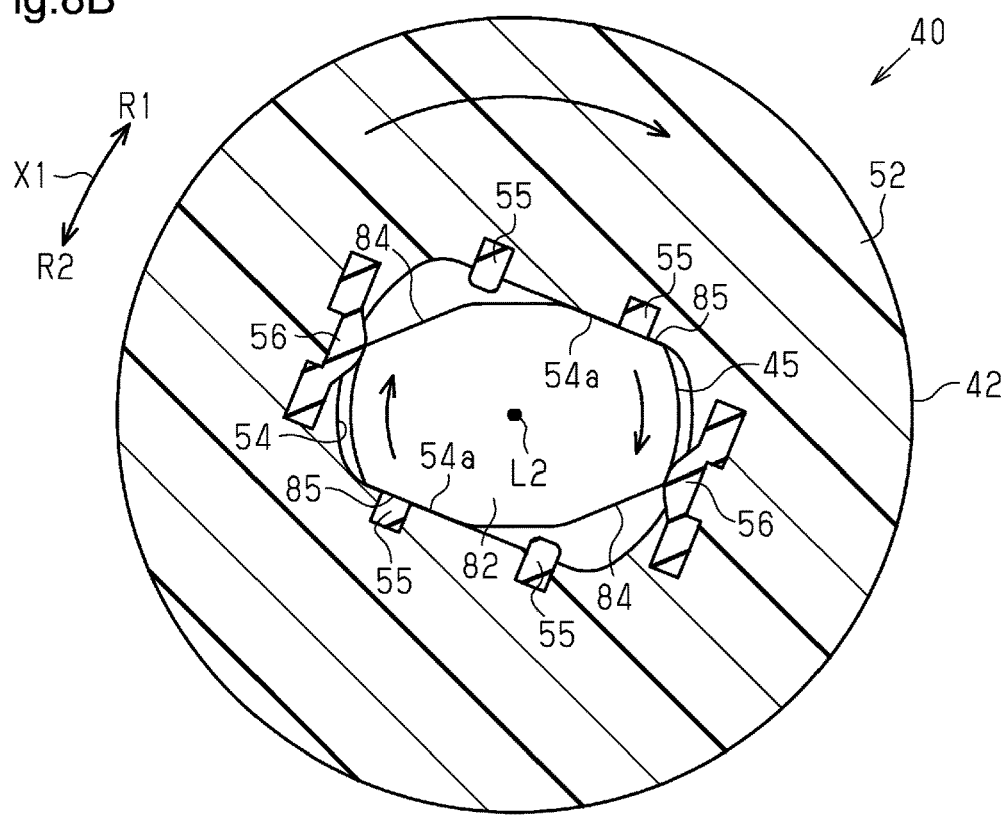

As shown in FIGS. 2 and 8A, when the motor unit 20 is energized and the motor unit 20 is driven, the rotary shaft 24 and the driving rotating body 42 are rotated. That is, the driving rotating body 42 is rotatably driven. FIGS. 8A and 8B show the driving rotating body 42 rotatably driven in a first direction R1. As shown in FIG. 8A, the rotation of the driving rotating body 42 in the first direction R1 abuts the circumferential ends of the roller releasing portions 57 of the driving rotating body 42 that are located at the front side in the rotation direction (elastic portions 58) against the first roller supports 64a of the roller holding portions 62 in the rotation direction and pushes the first roller supports 64a and the rollers 44 in the first direction R1. This arranges the rollers 44 at the central portion of the control surfaces 83 of the driven rotating body 45 in the circumferential direction. That is, the rollers 44 are in an unlocked state where the rollers 44 are not held between the control surfaces 83 and the clutch housing 41 (i.e., do not hinder rotation of driven rotating body 45).

In the unlocked state, as shown in FIG. 8B, the driving transmission surfaces 54a of the driving rotating body 42 abut against the second driven transmission surfaces 85 of the driven coupling portion 82 in the first direction R1 so that the driving rotating body 42 is connected to the driven rotating body 45 to integrally rotate in the rotation direction X1. This transmits the rotational driving force of the driving rotating body 42 (rotary shaft 24) to the driven rotating body 45 (worm shaft 34) so that the rotary shaft 24 and the worm shaft 34 integrally rotate in the first direction R1.

In this case, as shown in FIGS. 5 and 8A, when the first roller supports 64a are pushed by the roller releasing portions 57 in the first direction R1, the support member 43 and the rollers 44 are rotated about the rotation axis of the driving rotating body 42 (same as central axis L1) together with the driving rotating body 42 and the driven rotating body 45. Each roller 44 is rotated about the central axis L3 in a direction opposite to the rotation direction of the support member 43 between the roller supports 64a, 64b by the friction with the inner circumferential surface 41c of the clutch housing 41. When the rollers 44 are each rotated about the central axis L3 by an amount corresponding to the tolerance gap G1 between the roller supports 64a, 64b holding the rollers 44, the ends of the rollers 44 in the rotation direction X1 abut against the roller supports 64a, 64b. In the present embodiment, when the driving rotating body 42 is rotated in the first direction R1, the end of the first opposed surface 71a of the roller 44 that is close to the first arcuate surface 72a abuts against the first abutment surface 68a, and the end of the second opposed surface 71b that is close to the second arcuate surface 72b abuts against the second abutment surface 68b. This restricts the rotation of the roller 44 about the central axis L3 with the support member 43. Thus, even if each roller 44 is rotated about the rotation axis of the driving rotating body 42 together with the driving rotating body 42 when the driving rotating body 42 is rotatably driven, the roller 44 is rotated about the central axis L3 only by an amount permitted by the support member 43.

The rotation of the worm shaft 34 in the first direction R1 is transmitted to the output shaft 38, while reduced in speed between the worm shaft 34 and the worm wheel 37, and output from the output shaft 38. A window glass of the vehicle is raised and lowered via a window regulator (not shown) in accordance with the rotation direction of the output shaft 38. When the motor unit 20 is de-energized, the rotation and driving of the rotary shaft 24, namely, the rotation and driving of the driving rotating body 42, is stopped.

Figure 9A:
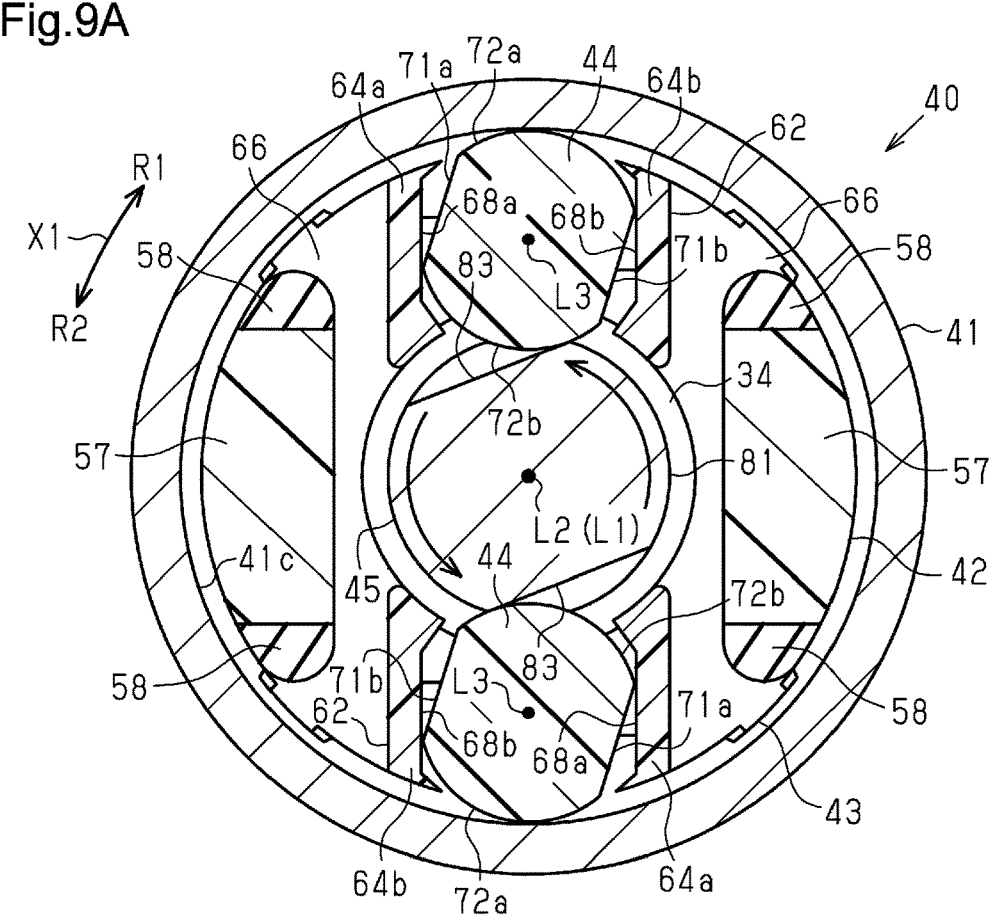
FIGS. 9A and 9B are cross-sectional views showing the operation of the clutch according to the embodiment.
Figure 9B:
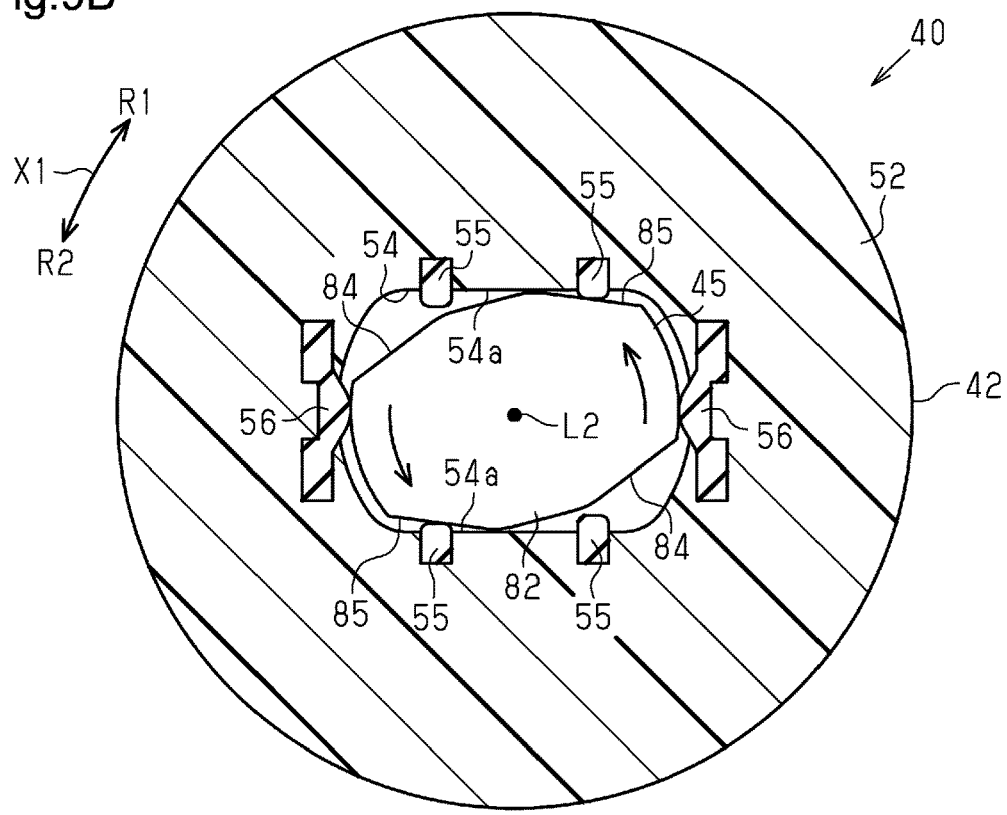

As shown in FIGS. 9A and 9B, in a state where the driving of the motor unit 20 is stopped, that is, when the rotary shaft 24 (driving rotating body 42) is in a non-rotatably driven state, the load applied to the output shaft 38 by a load (window regulator in present embodiment) act to rotate the driven rotating body 45. FIGS. 9A and 9B show the driven rotating body 45 when acting to rotate in the second direction R2. The control surfaces 83 of the driven rotating body 45 push outward the rollers 44, which are arranged between the control surfaces 83 and the inner circumferential surface 41c of the clutch housing 41. The first arcuate surface 72a of each roller 44 pushed by the control surface 83 abuts the inner circumferential surface 41c of the clutch housing 41 between the roller supports 64a, 64b. Further, the second arcuate surface 72b of the roller 44 abuts the end of the control surface 83 in the circumferential direction that is separated from the center of the control surface 83 in the circumferential direction (rear end of control surface 83 in second direction R2). The roller 44 is held between the control surface 83 at a portion close to the rear end in the second direction R2 and the inner circumferential surface 41c of the clutch housing 41. Thus, the roller 44 serves as a wedge restricting rotation (rotation in second direction R2) of the driven rotating body 45 (that is, locks rotation of worm shaft 34). This restricts the rotation of the output shaft 38 when the rotary shaft 24 (driving rotating body 42) is in a non-rotatably driven state. When the driven rotating body 45 is arranged in a lock position (position that holds roller 44 with clutch housing 41) as shown in FIG. 9A, the second driven transmission surfaces 85 of the driven coupling portion 82 do not contact the driving transmission surfaces 54a of the driving rotating body 42 in the rotation direction (second direction R2) as shown in FIG. 9B.

When the motor unit 20 (driving rotating body 42) is in a non-driving state, rotation of the driven rotating body 45 in the first direction R1 is restricted in the same manner. That is, the roller 44 is held between of the control surface 83 at the portion close to the rear end in the first direction R1 and the inner circumferential surface 41c of the clutch housing 41 so that the roller 44, serving as a wedge, restricts the rotation of the driven rotating body 45 (rotation in first direction R1), that is, locks the rotation of the worm shaft 34.

Figure 10A:
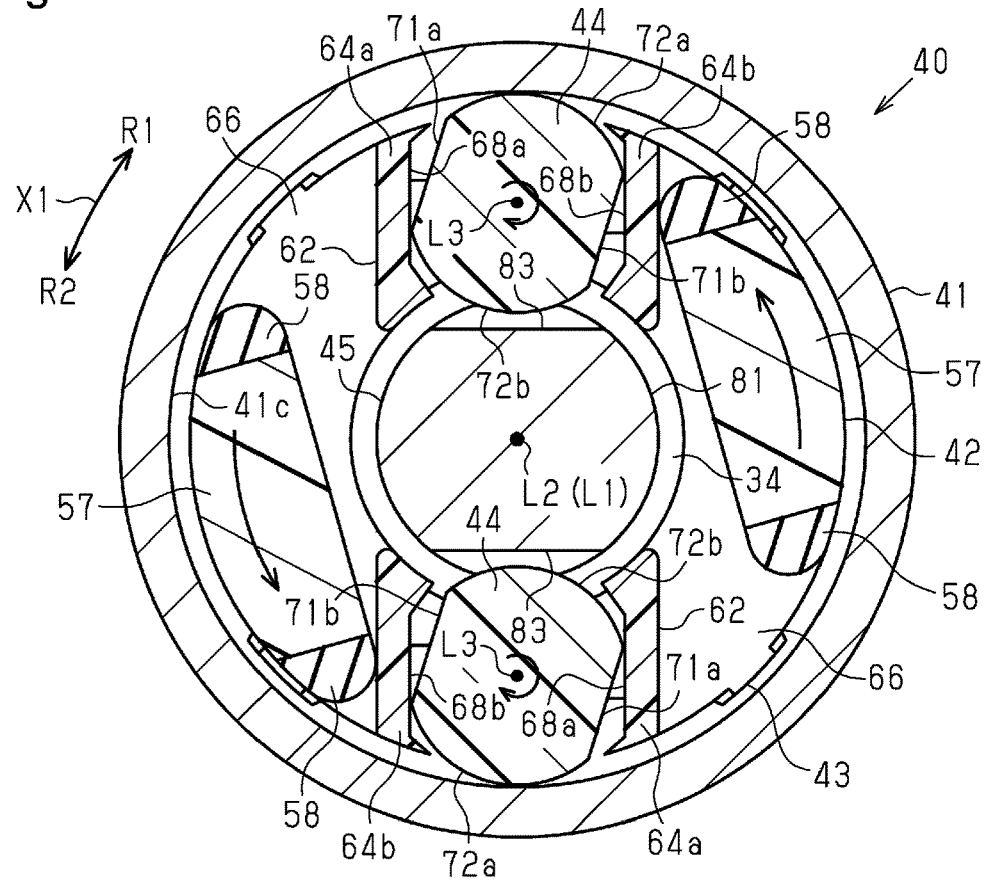
FIGS. 10A and 10B are cross-sectional views showing the operation of the clutch according to the embodiment.
Figure 10B:
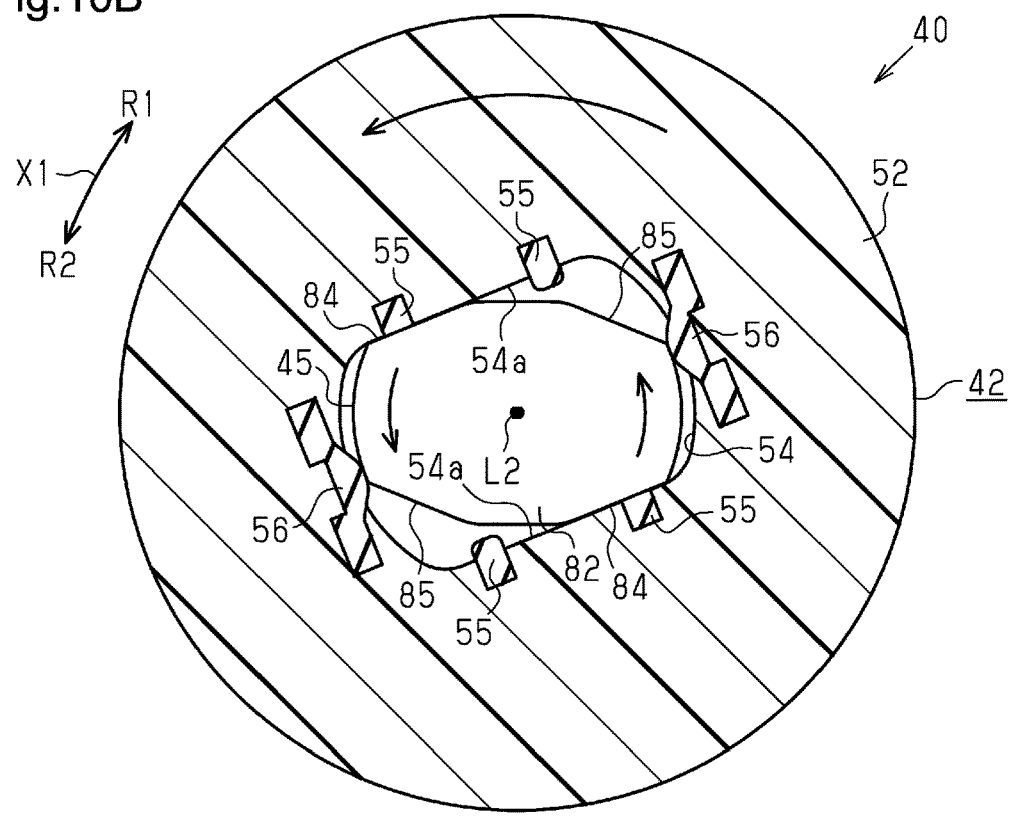

As shown in FIGS. 2, 10A, and 10B, when the driving rotating body 42 is driven by the motor unit 20 and rotated in the second direction R2 together with the rotary shaft 24, each member is rotated in the opposite direction. However, the clutch 40 couples the rotary shaft 24 to the worm shaft 34 in the same manner as when the driving rotating body 42 rotates in first direction R1 (refer to FIG. 8). That is, the rotation of the driving rotating body 42 in the second direction R2 abuts the circumferential ends of the roller releasing portions 57 of the driving rotating body 42 that are located at the front side in the rotation direction (elastic portions 58) against the second roller supports 64b of the roller holding portions 62 in the rotation direction and pushes the second roller supports 64b and the rollers 44 in the second direction R2. This arranges the rollers 44 at the central portion of the control surfaces 83 of the driven rotating body 45 in the circumferential direction so that the rollers 44 are in an unlocked state where the rollers 44 are not held between the control surfaces 83 and the clutch housing 41. In the unlocked state, the driving transmission surfaces 54a of the driving rotating body 42 abut the first driven transmission surfaces 84 of the driven coupling portion 82 in the second direction R2 so that the rotational driving force of the driving rotating body 42 (rotary shaft 24) is transmitted to the driven rotating body 45 (worm shaft 34) and the rotary shaft 24 and the worm shaft 34 integrally rotate the in second direction R2.

In this case, as shown in FIGS. 5 and 10A, when the second roller supports 64b are pushed by the roller releasing portions 57 in the second direction R2, the support member 43 and the rollers 44 are rotated about the rotation axis of the driving rotating body 42 together with the driving rotating body 42 and the driven rotating body 45. Each roller 44 is rotated about the central axis L3 in a direction opposite to the rotation direction of the support member 43 between the roller supports 64a, 64b by the friction with the inner circumferential surface 41c of the clutch housing 41. When the rollers 44 are each rotated about the central axis L3 by an amount corresponding to the tolerance gap G1 between the roller supports 64a, 64b holding the rollers 44, the ends of the rollers 44 in the rotation direction X1 abut against the roller supports 64a, 64b. In the present embodiment, when the driving rotating body 42 is rotated in the second direction R2, the end of the first opposed surface 71a of the roller 44 that is close to the second arcuate surface 72b abuts against the first abutment surface 68a, and the end of the second opposed surface 71b that is close to the first arcuate surface 72a abuts against the second abutment surface 68b. This restricts the rotation of the roller 44 about the central axis L3 with the support member 43. Thus, even if each roller 44 is rotated about the rotation axis of the driving rotating body 42 together with the driving rotating body 42 when the driving rotating body 42 is rotatably driven, the roller 44 is rotated about the central axis L3 only by an amount permitted by the support member 43.

When the rotation of the worm shaft 34 in the second direction R2 is transmitted to the output shaft 38 and output from the output shaft 38, a window glass of the vehicle is raised and lowered via a window regulator (not shown) in accordance with the rotation direction of the output shaft 38. When the motor unit 20 is de-energized, the rotation and driving of the rotary shaft 24, namely, the rotation and driving of the driving rotating body 42, is stopped. After the driving of the motor unit 20 has been stopped, the roller 44, serving as a wedge, restricts the rotation of the driven rotating body 45, (that is, locks rotation of worm shaft 34) to restrict the rotation of the output shaft 38 (refer to FIG. 9A).

The present embodiment has the following advantages.

(1) The support member 43 includes the first end drawing slope 91 and the second end drawing slope 92 that serve as a guiding portion and a drawing slope to guide grease GR from the gap between the inner circumferential surface 41c of the clutch housing 41 and the roller 44 to the gap between the inner circumferential surface 41c of the clutch housing 41 and the roller 44 during rotation as shown by arrows Z1, Z2 in FIG. 4A. This ensures that a sufficient amount of grease GR is held in the gap between the inner circumferential surface 41c of the clutch housing 41 and the roller 44, thereby maintaining appropriate friction (coefficient of friction) between the inner circumferential surface 41c of the clutch housing 41 and the roller 44 and maintaining the functionality for restricting the rotation of the driven side in a preferred manner when the driving side is in a non-driving state.

(2) The first end drawing slope 91 and the second end drawing slope 92, which are surfaces that intersect the circumferential direction, extend from the outer side of the axial range H1 and the outer side of the circumferential range W1 of the roller 44 as viewed from the outer side in the radial direction. The first end drawing slope 91 and the second end drawing slope 92 are inclined to extend toward the roller 44 in the axial direction and the circumferential direction. This guides grease GR to the gap between the inner circumferential surface 41c of the clutch housing 41 and the roller 44 during rotation. That is, the rotating first end drawing slope 91 and the second end drawing slope 92 collect grease GR arranged outside the axial range H1 of the roller 44 and send the grease GR along its inclined surfaces. This guides the grease GR into the axial range H1 of the roller 44.

(3) The first end drawing slope 91 and the second end drawing slope 92 extend inward from the ends of the axial range H1 of the roller 44. This guides grease GR to the inner sides of the ends of the axial range H1 of the roller 44. Thus, grease GR is more effectively used than when the grease GR is guided to, for example, the ends of the axial range H1 of the roller 44. That is, if grease GR is guided only to the ends of the axial range H1 of the roller 44, the grease GR may immediately move out of the axial range H1. However, this will be avoided by the first end drawing slope 91 and the second end drawing slope 92. Further, if grease GR is guided only to the ends of the axial range H1 of the roller 44, the grease GR may fail to reach the vicinity of the central portion of the axial range H1 of the roller 44, and appropriate friction (coefficient of friction) between the inner circumferential surface 41c of the clutch housing 41 and the roller 44 may not be maintained. However, this will be avoided by the first end drawing slope 91 and the second end drawing slope 92.

(4) The first end drawing slope 91 extends outward in the radial direction from the roller holding portion 62 including the axial support portion 63. Thus, the first end drawing slope 91 effectively collects grease GR arranged outside one axial end of the roller 44 and guides the grease GR into the axial range H1 of the roller 44.

(5) The second end drawing slope 92 extends outward in the radial direction from the coupling portion 66. Thus, the second end drawing slope 92 effectively collects grease GR arranged outside the other axial end of the roller 44 and guides the grease GR into the axial range H1 of the roller 44.

The present embodiment may be modified as described below. The present embodiment and the following modifications can be combined as long as the combined modifications are not in technical contradiction.

In the above embodiment, the first end drawing slope 91 and the second end drawing slope 92 serve as a guiding portion. Instead, other guiding portions may guide grease GR to the gap between the inner circumferential surface 41c of the clutch housing 41 and the roller 44 during rotation.

Figure 11:
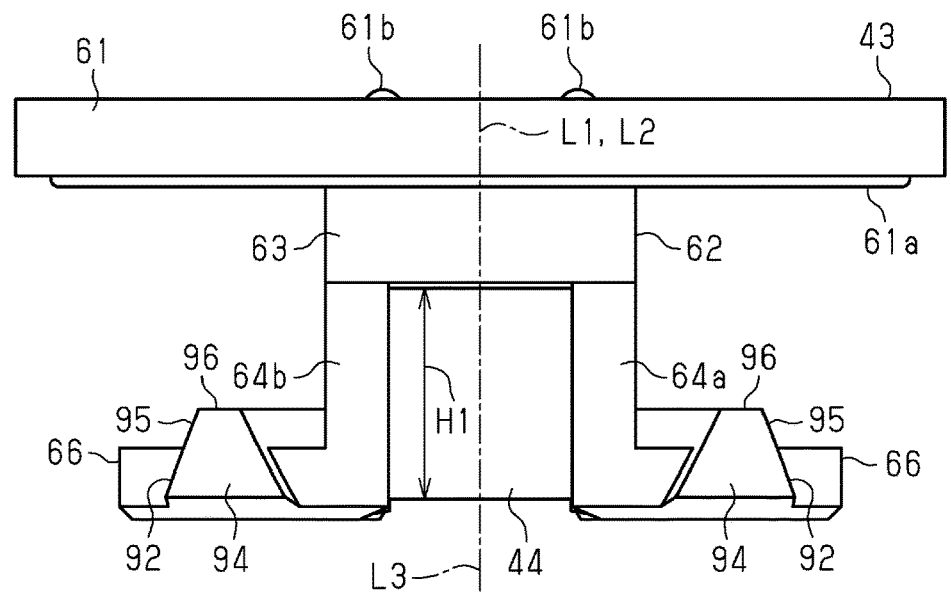
FIG. 11 is a side view showing a support member that holds a roller in a clutch according to a modification.
Figure 12:
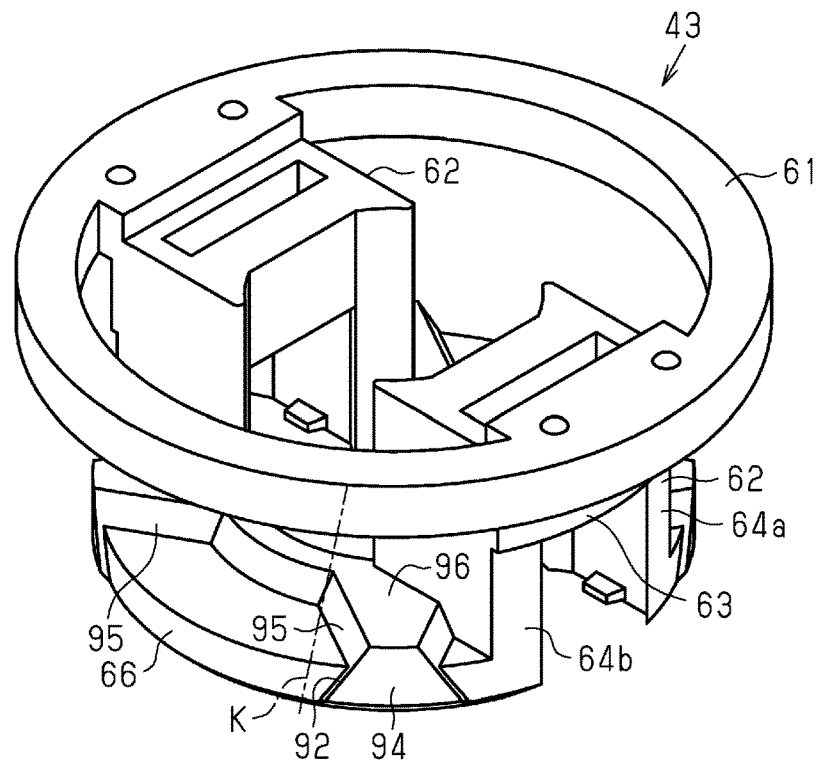
FIG. 12 is a perspective view showing the support member in the clutch in the modification.

As shown in, for example, FIGS. 11 and 12, the guiding portion may include a radial guiding surface 95 that intersects with the circumferential direction and guides grease GR, located on one axial end surface of the coupling portion 66, outward in the radial direction during rotation.

Specifically, the support member 43 in this example includes an axial bulging portion 96 that extends in the axial direction at a circumferential position that corresponds to the second end bulging portion 94 (second end drawing slope 92) in the same manner as the above embodiment on one axial end surface of the coupling portion 66. The surface of the axial bulging portion 96 that intersects with the circumferential direction serves as the radial guiding surface 95. The radial guiding surface 95 is inclined relative to the radial direction (line K extending through axis) as viewed in the axial direction so that the grease GR on one axial end surface of the coupling portion 66 can be easily guided outward in the radial direction during rotation. The radial guiding surface 95 in this example is continuous (same plane) with the second end drawing slope 92.

In this manner, the radial guiding surface 95 guides the grease GR that has moved to one axial end surface of the coupling portion 66 to the inner circumferential surface 41c of the clutch housing 41. The radial guiding surface 95 in this example is inclined relative to the radial direction as viewed in the axial direction so that the grease GR that has moved to one axial end surface of the coupling portion 66 is guided more smoothly to the inner circumferential surface 41c of the clutch housing 41 in comparison with when the radial guiding surface 95 is not inclined relative to the radial direction. The radial guiding surface 95 in this example is continuous with the second end drawing slope 92 so that grease GR that has moved to one axial end surface of the coupling portion 66 is smoothly guided to the central portion of the axial range H1 of the roller 44 while being guided to the inner circumferential surface of the clutch housing 41.

Figure 13:
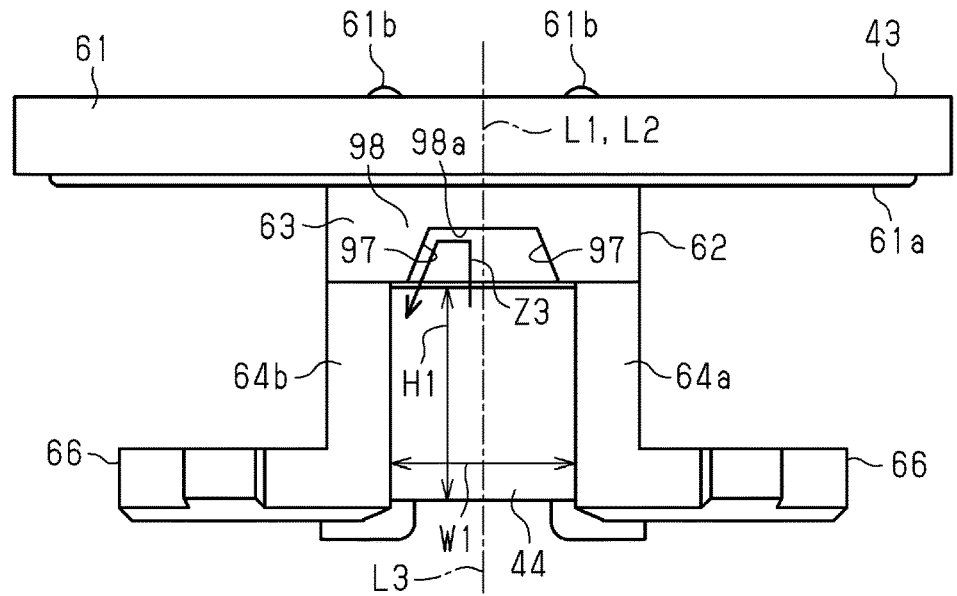
FIG. 13 is a side view showing the support member that holds the roller in the clutch in the modification.
Figure 14:
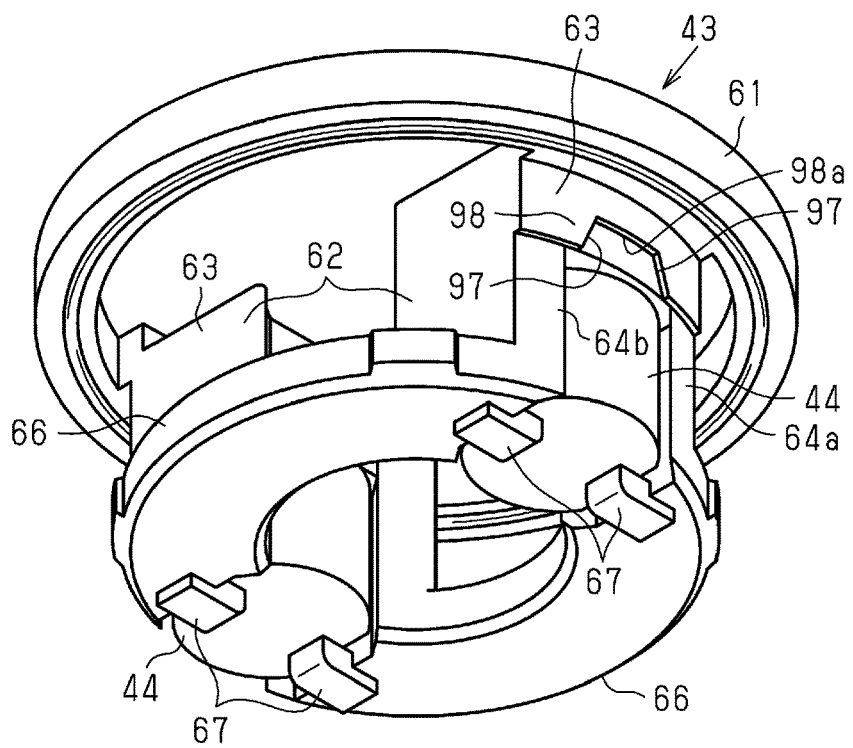
FIG. 14 is a perspective view showing the support member that holds the roller in the clutch in the modification.
Figure 15:
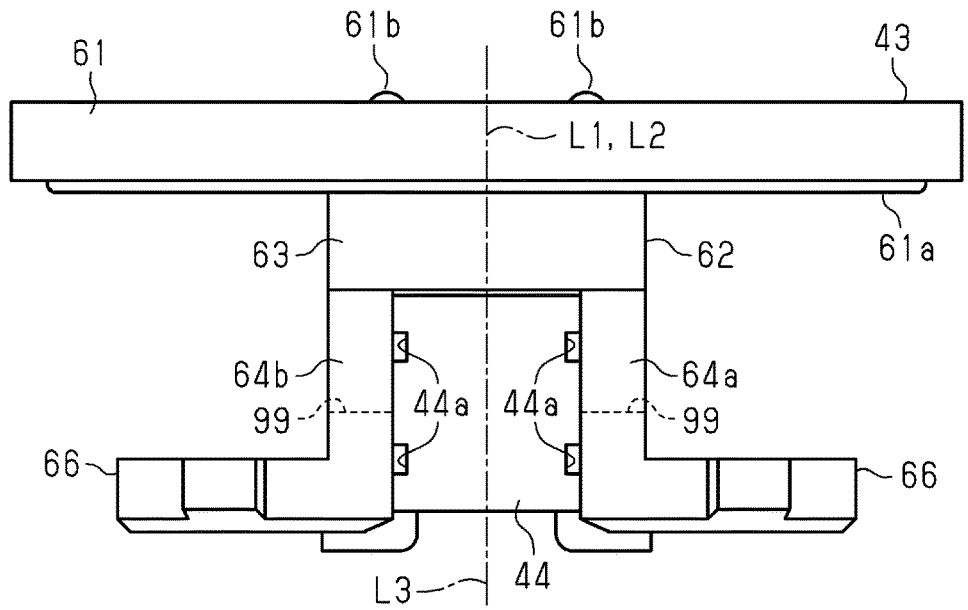
FIG. 15 is a side view showing the support member that holds the roller in the clutch in the modification.

Further, as shown in, for example, FIGS. 13 and 14, return slopes 97 may be used as a guiding portion. Each return slope 97 is a surface that intersects with the circumferential direction. The return slope 97 extends from the outer side of axial range H1 and the inner side of the circumferential range W1 of the roller 44 as viewed from the outer side in the radial direction. The return slope 97 is inclined to extend toward the roller 44 in the axial direction and a side of the roller 44 in the circumferential direction.

Specifically, the axial support portion 63 of the support member 43 includes a bulging portion 98 that extends outward in the radial direction. The bulging portion 98 includes a cutout part 98a of which the circumferential width increases toward the roller 44 as viewed from the outer side in the radial direction (refer to FIG. 13). Circumferential end surfaces of the cutout part 98a serve as the return slopes 97.

This guides the grease GR, moved in the axial direction of the roller 44 from the gap between the inner circumferential surface 41c of the clutch housing 41 and the roller 44, back to the axial range H1 of the roller 44 immediately during rotation (without leaving from circumferential range W1 of roller 44) as shown by arrow Z3 in FIG. 13.

As shown in, for example, FIGS. 15 to 18, through guiding portions 99 that extend through the roller supports 64a, 64b around the rotation axis of the driving rotating body 42 may be used as a guiding portion.

Figure 16:
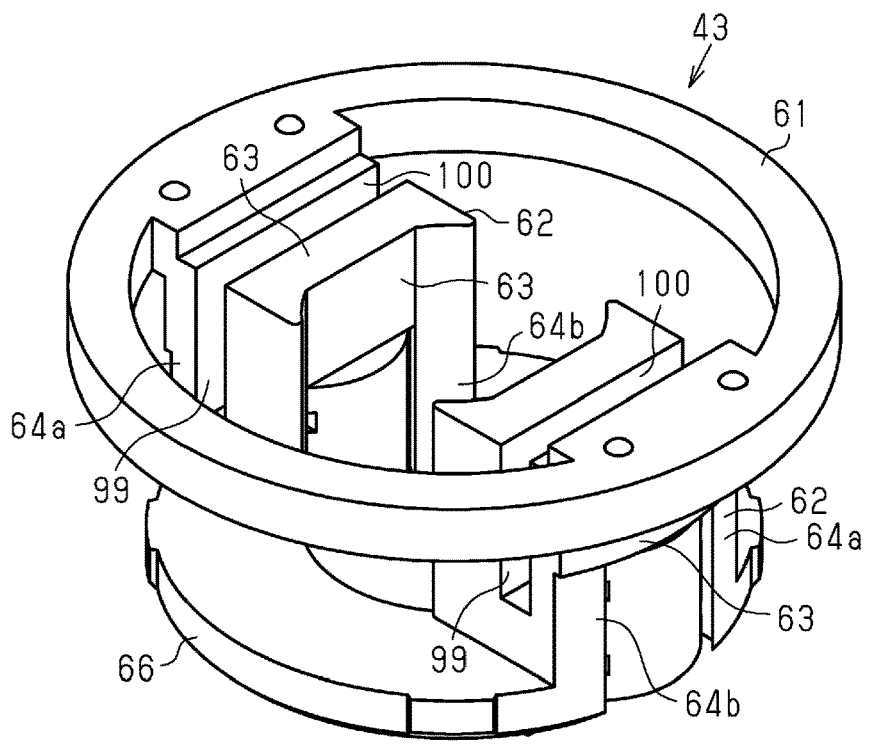
FIG. 16 is a perspective view showing the support member that holds the roller in the clutch in the modification.

Specifically, as shown in FIG. 16, the support member 43 in this example includes grooves 100 extending in the circumferential direction (specifically, tangential direction). Each groove 100 extends from one axial end of each axial support portion 63 to an intermediate portion of the corresponding one of the roller supports 64a, 64b in the axial direction. Portions of the support member 43 that correspond to the roller supports 64a, 64b of the groove 100 serve as the through guiding portions 99.

The rollers 44 in this example includes guide grooves 44a in the surfaces that are opposed to the roller supports 64a, 64b, that is, the first and second opposed surfaces 71a, 71b. The guide grooves 44a extend toward the inner circumferential surface 41c of the clutch housing 41 (outward in radial direction when installed). In this example, two guide grooves 44a are arranged next to one another in the axial direction of the roller 44.

Figure 17:
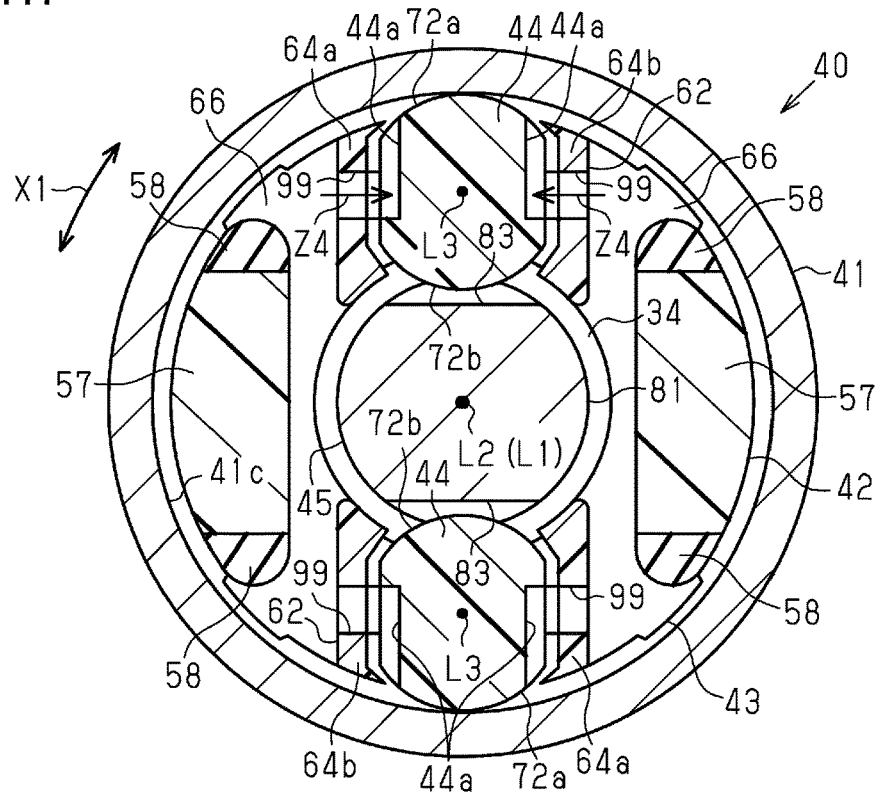
FIG. 17 is a cross-sectional view showing the operation of the clutch in the modification.

This structure guides grease GR that has moved to the sides of the roller supports 64a, 64b where the rollers 44 are not arranged (outward from rotation axis of driving rotating body 42) toward the rollers 44 via the through guiding portions 99 as shown by arrows Z4 in FIG. 17. The grease GR guided to the roller 44 via the through guiding portions 99 is guided toward the inner circumferential surface 41c of the clutch housing 41 by the guide grooves 44a.

Figure 18:
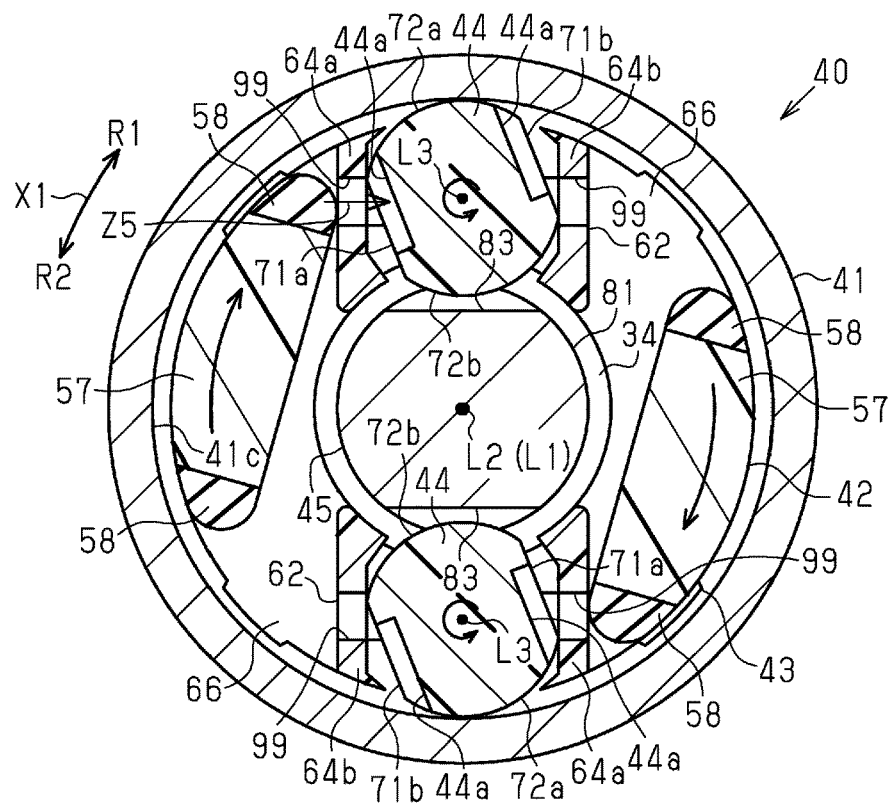
FIG. 18 is a cross-sectional view showing the operation of the clutch in the modification.

In this example, as shown in FIG. 18, each roller releasing portion 57 (specifically, elastic portion 58) of the driving rotating body 42 is configured to force the grease GR, which has been moved toward the sides of the roller supports 64a, 64b where the roller 44 is not arranged, into the through guiding portion 99 as shown by arrow Z5 when the driving rotating body 42 is rotatably driven. This forcibly guides the grease GR to the roller 44 via the through guiding portion 99.

In the above embodiment, the first end bulging portion 93 and the second end bulging portion 94 are bulged by the same amount. Instead, the first end bulging portion 93 and the second end bulging portion 94 may be bulged by different amounts.

In the above embodiment, the first end drawing slopes 91 and the second end drawing slopes 92 are arranged to be linearly symmetrical with respect to the central axis L3 of the roller 44 as viewed from the outer side in the radial direction (refer to FIG. 4A). Instead, if the rotary shaft rotates in a single direction, the first end drawing slopes 91 and the second end drawing slopes 92 do not have to be linearly symmetrical.

In the above embodiment, the support member 43 includes the first end drawing slope 91 and the second end drawing slope 92. Instead, the support member 43 may include only one of the first end drawing slope 91 and the second end drawing slope 92.

In the above embodiment, the present disclosure is directed to the motor 10 including the clutch 40. Instead, the present disclosure may be directed to a non-motor device including the clutch 40.

The present disclosure is described using embodiments. However, the present disclosure is not limited to these embodiments and structures. The present disclosure includes various variations and modifications within the scope of equivalence. In addition, various combinations and forms and other combinations and forms, which include one or more elements, are within the scope or range of the concept of the present disclosure.

The invention claimed is:

1. A clutch comprising:
an annular clutch housing;
a driving rotating body that is rotatably driven;
a driven rotating body to which rotational driving force is transmitted from the driving rotating body;
a roller arranged between an inner circumferential surface of the clutch housing and the driven rotating body, wherein, when the driving rotating body is rotatably driven, the roller is rotated about a rotation axis of the driving rotating body together with the driving rotating body, and when the driving rotating body is in a non-rotatably driven state, the roller is held between the inner circumferential surface of the clutch housing and the driven rotating body to restrict rotation of the driven rotating body;
a support member that holds the roller between the inner circumferential surface of the clutch housing and the driven rotating body, wherein the support member is rotated about the rotation axis of the driving rotating body together with the driving rotating body; and
grease arranged at least between the inner circumferential surface of the clutch housing and the roller, wherein
the support member includes a guiding portion that guides grease, which has been moved from a space between the inner circumferential surface of the clutch housing and the roller to at least one of an outer side of an axial range of the roller and an outer side of a circumferential range of the roller, back to the space between the inner circumferential surface of the clutch housing and the roller during rotation.

2. The clutch according to claim 1, wherein
the guiding portion includes a drawing slope that intersects with a circumferential direction,
the drawing slope extends from the outer side of the axial range and the circumferential range of the roller as viewed from an outer side in a radial direction, and
the drawing slope is inclined to extend toward the roller in an axial direction and in the circumferential direction.

3. The clutch according to claim 2, wherein the drawing slope extends inward from an end of the axial range of the roller.

4. The clutch according to claim 2, wherein the support member includes
a roller holding portion that includes
an axial support portion that covers and supports one axial end of the roller, and
two roller supports that extend in the axial direction from two sides of the axial support portion around the rotation axis of the driving rotating body to support two sides of the roller around the rotation axis of the driving rotating body,
wherein the drawing slope includes a first end drawing slope that extends outward in the radial direction from the roller holding portion including the axial support portion.

5. The clutch according to claim 2, wherein the support member includes
roller holding portions, each including
an axial support portion that covers and supports one axial end of the roller, and
two roller supports that extend in the axial direction from two sides of the axial support portion around the rotation axis of the driving rotating body to support two sides of the roller around the rotation axis of the driving rotating body, and
a coupling portion that couples distal ends of the roller supports of different ones of the roller holding portions around the rotation axis of the driving rotating body,
wherein the drawing slope includes a second end drawing slope that extends outward in the radial direction from the coupling portion.

6. The clutch according to claim 5, wherein
the guiding portion includes a radial guiding surface that intersects with the circumferential direction,
the radial guiding surface is configured to guide grease from one axial end surface of the coupling portion outward in the radial direction during rotation, and
the radial guiding surface is continuous with the second end drawing slope.

7. The clutch according to claim 5, wherein
the guiding portion includes a radial guiding surface that intersects with the circumferential direction,
the radial guiding surface is configured to guide grease from one axial end surface of the coupling portion outward in the radial direction during rotation,
the radial guiding surface is inclined relative to the radial direction as viewed in the axial direction, and
the radial guiding surface is continuous with the second end drawing slope.

8. The clutch according to claim 1, wherein the support member includes
roller holding portions, each including
an axial support portion that covers and supports one axial end of the roller, and
two roller supports that extend in an axial direction from two sides of the axial support portion around the rotation axis of the driving rotating body to support two sides of the roller around the rotation axis of the driving rotating body, and
a coupling portion that couples distal ends of the roller supports of different ones of the roller holding portions around the rotation axis of the driving rotating body, wherein
the guiding portion includes a radial guiding surface that intersects with a circumferential direction, and
the radial guiding surface is configured to guide grease from one axial end surface of the coupling portion outward in a radial direction during rotation.

9. The clutch according to claim 8, wherein the radial guiding surface is inclined relative to the radial direction as viewed in the axial direction.

10. The clutch according to claim 1, wherein
the guiding portion includes a return slope that intersects with a circumferential direction,
the return slope extends from the outer side of the axial range and an inner side of the circumferential range of the roller as viewed from an outer side in a radial direction, and
the return slope is inclined to extend toward the roller in an axial direction and a side of the roller in the circumferential direction.

11. The clutch according to claim 1, wherein
the support member includes a roller holding portion that includes
an axial support portion that covers and supports one axial end of the roller, and
two roller supports that extend in an axial direction from two sides of the axial support portion around the rotation axis of the driving rotating body to support two sides of the roller around the rotation axis of the driving rotating body,
wherein the guiding portion includes a through guiding portion that extends through one of the roller supports around the rotation axis of the driving rotating body.

12. The clutch according to claim 11, wherein the roller includes a guide groove in a surface that is opposed to one of the roller supports, and the guide groove extends toward the inner circumferential surface of the clutch housing.

13. A motor comprising:
a motor unit including a rotary shaft that is rotatably driven;
the clutch according to claim 1, the clutch including the driving rotating body that rotates integrally with the rotary shaft; and
an output unit including a driven shaft that rotates integrally with the driven rotating body, the output unit outputting rotational driving force transmitted to the driven shaft.

\* \* \* \* \*